(12) United States Patent
Thompson

(10) Patent No.: US 10,888,723 B2
(45) Date of Patent: Jan. 12, 2021

(54) SELF-RETRACTING LANYARD WITH FALL PROTECTION HARNESS TRACKER

(71) Applicant: Jeffrey D. Thompson, Irvine, CA (US)

(72) Inventor: Jeffrey D. Thompson, Irvine, CA (US)

( * ) Notice: Subject to any disclaimer, the term of this patent is extended or adjusted under 35 U.S.C. 154(b) by 0 days.

(21) Appl. No.: 16/548,660

(22) Filed: Aug. 22, 2019

(65) Prior Publication Data

US 2019/0374798 A1 Dec. 12, 2019

Related U.S. Application Data

(63) Continuation-in-part of application No. 16/261,151, filed on Jan. 29, 2019, which is a continuation-in-part of application No. 15/817,759, filed on Nov. 20, 2017, now Pat. No. 10,722,739, which is a continuation-in-part of application No. 15/415,651, filed on Jan. 25, 2017, now Pat. No. 9,852,598.

(51) Int. Cl.
| | |
|---|---|
| *G08B 23/00* | (2006.01) |
| *A62B 35/00* | (2006.01) |
| *H02S 99/00* | (2014.01) |
| *A62B 99/00* | (2009.01) |
| *H02S 40/38* | (2014.01) |

(52) U.S. Cl.
CPC .......... *A62B 35/0093* (2013.01); *A62B 99/00* (2013.01); *H02S 99/00* (2013.01); *H02S 40/38* (2014.12)

(58) Field of Classification Search
CPC .............................. A62B 35/0093; G08B 23/00
USPC ......... 340/573.3, 573.7, 507, 517, 519, 521, 340/540, 541; 182/3, 5–6, 8, 192, 231, 182/232
See application file for complete search history.

(56) References Cited

U.S. PATENT DOCUMENTS

| | | | | |
|---|---|---|---|---|
| 5,878,833 | A * | 3/1999 | Bell .......................... | A62B 1/14 182/192 |
| 2006/0055545 | A1 | 3/2006 | Graef | |
| 2009/0211849 | A1 | 8/2009 | Smith | |
| 2010/0116922 | A1* | 5/2010 | Choate ................... | A62B 35/04 242/384.7 |
| 2011/0147125 | A1 | 6/2011 | Blomberg | |

(Continued)

OTHER PUBLICATIONS

Capital Safety, USA 2014 Price List, catalog, Jul. 1, 2014, 64 pages.
Rigid Lifelines, Fall Protection Solutions, catalog, 88 pages.

*Primary Examiner* — Tai T Nguyen
(74) *Attorney, Agent, or Firm* — Stetina Brunda Garred and Brucker

(57) ABSTRACT

A self-retracting lanyard including a main body and a retractable line. The retractable line is coupled to the main body so as to be extendible and retractable relative to the main body and to be restricted from extending relative to the main body in response to a user of the self-retracting lanyard falling. The self-retracting lanyard further includes a manual control operable by the user to initiate controlled descent of the retractable line relative to the main body. The manual control may be operable by the user to deliver a fluid (e.g. compressed gas) from a fluid supply disposed in a housing of the manual control to an actuator of the main body to initiate controlled descent. Solar panel(s) may be disposed on the main body. When the retractable line is retracted, the housing may dock with and be charged by a solar powered charger disposed on the main body.

19 Claims, 17 Drawing Sheets

(56) References Cited

U.S. PATENT DOCUMENTS

| | | |
|---|---|---|
| 2015/0027808 A1 | 1/2015 | Baillargeon |
| 2015/0375020 A1* | 12/2015 | Palet .................. A62B 35/0068 248/542 |
| 2016/0107007 A1* | 4/2016 | Pollard .............. A62B 35/0075 182/3 |
| 2016/0220857 A1 | 8/2016 | Rappoport |
| 2017/0252591 A1 | 9/2017 | Hetrich |
| 2018/0126198 A1* | 5/2018 | Troy .................. A62B 35/0093 |

* cited by examiner

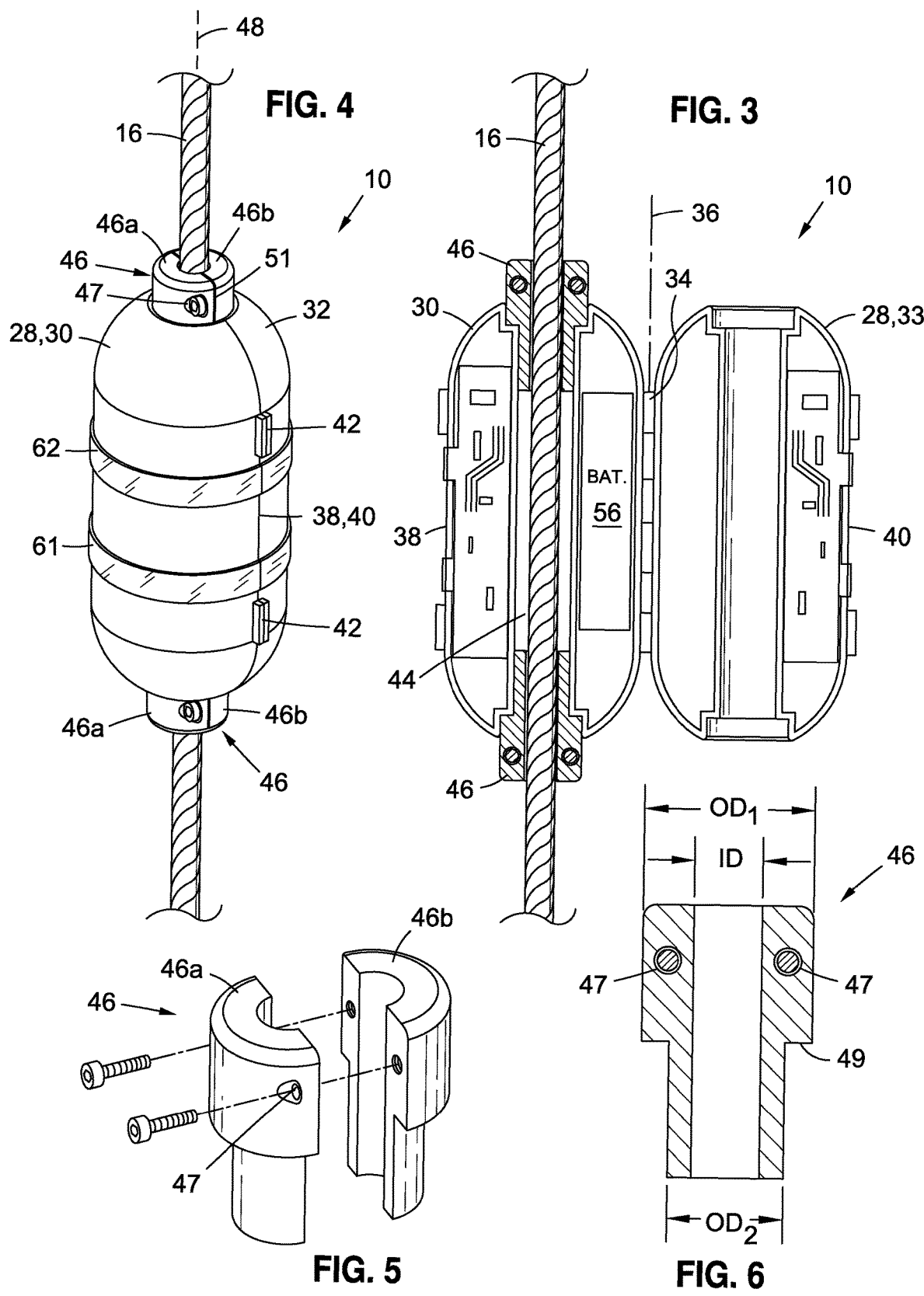

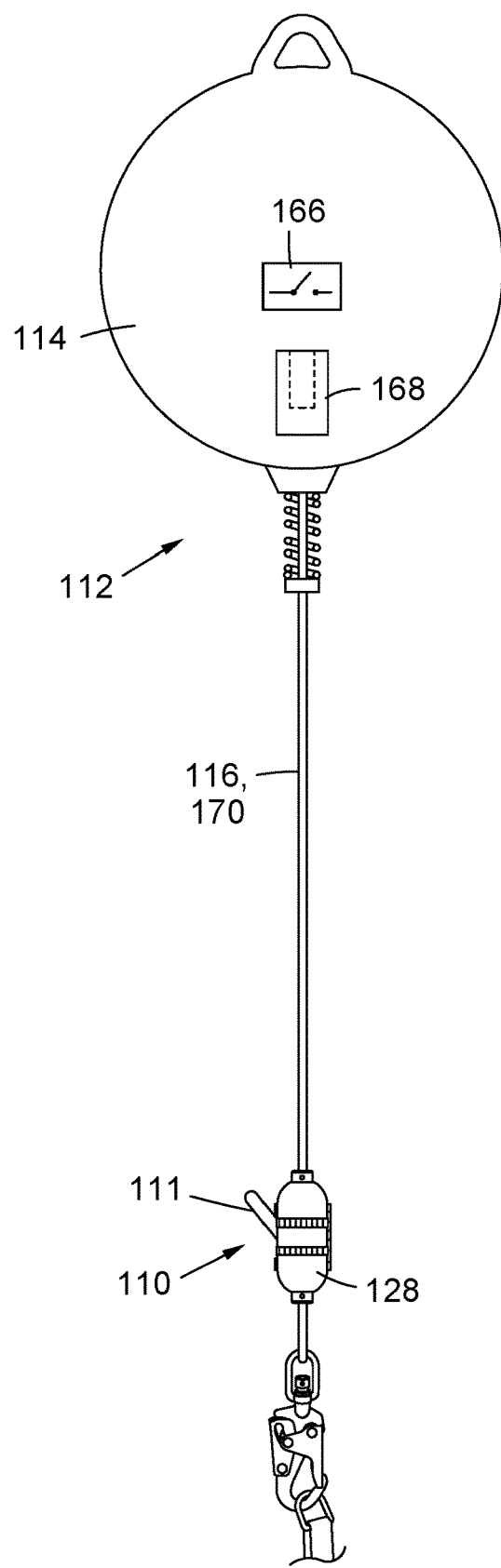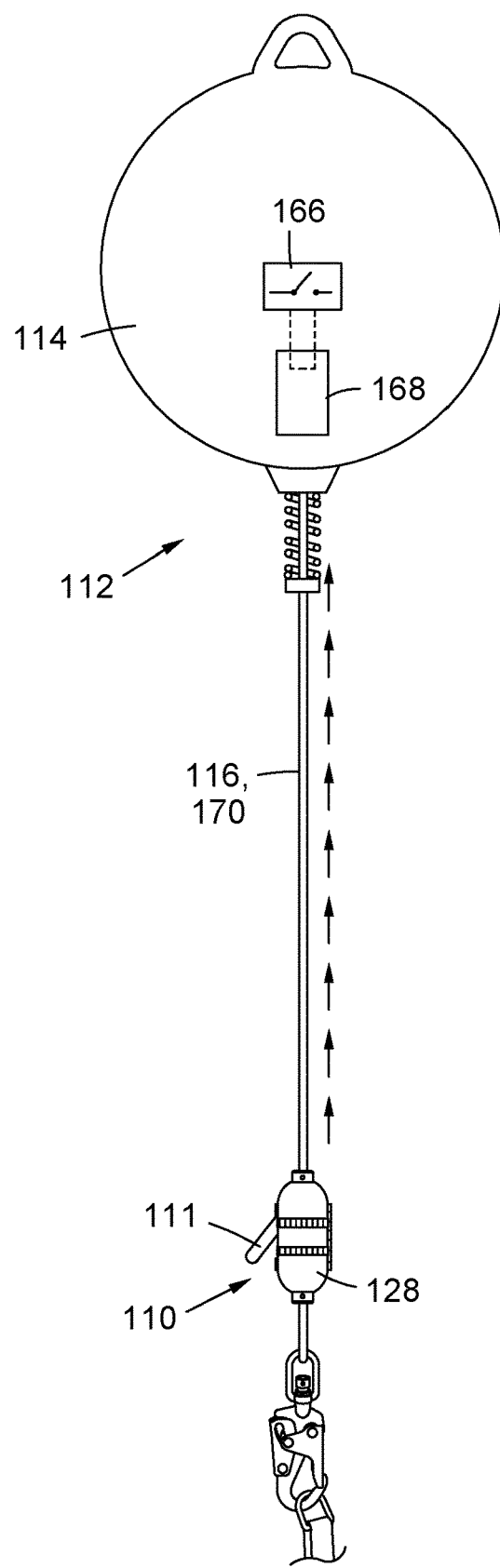
FIG. 11A     FIG. 11B

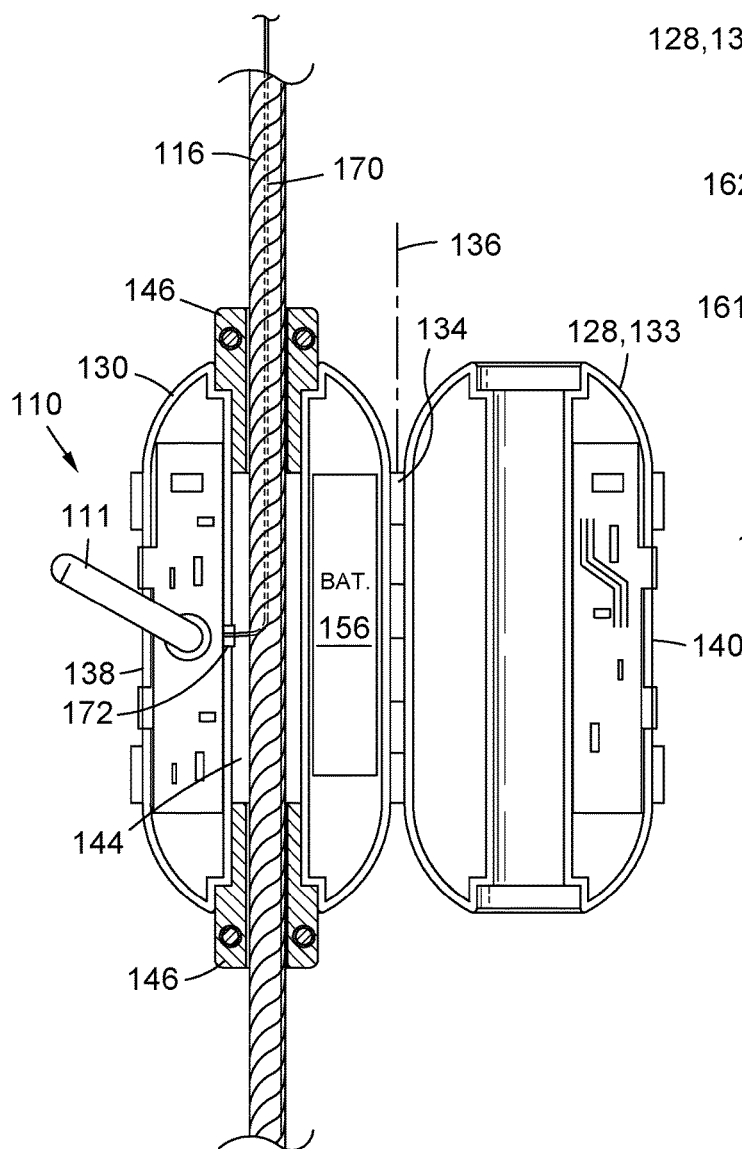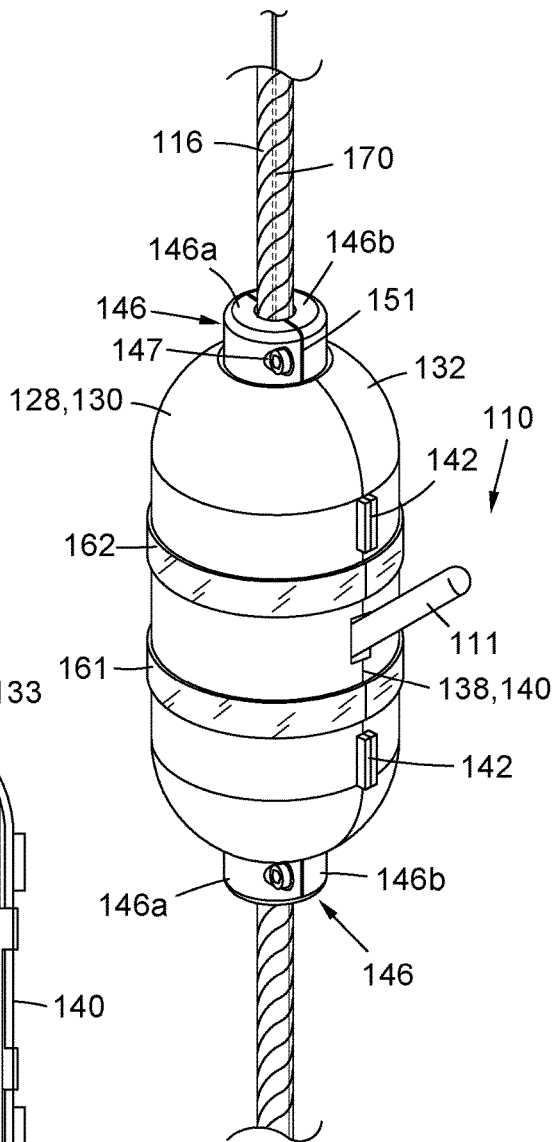
FIG. 12
FIG. 13

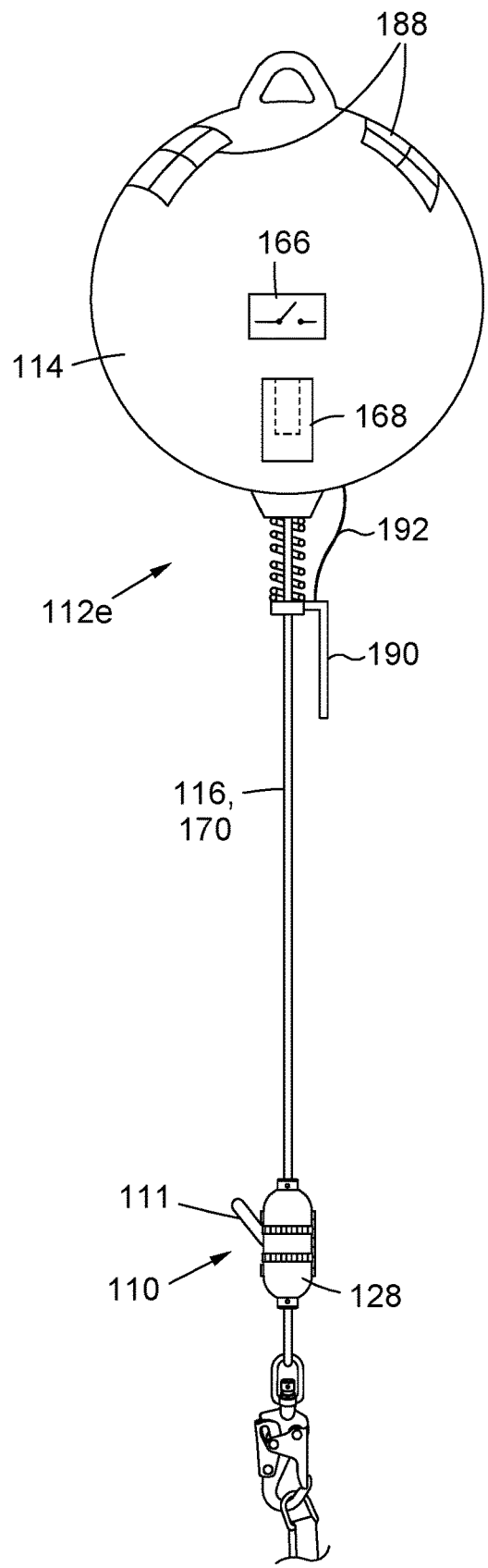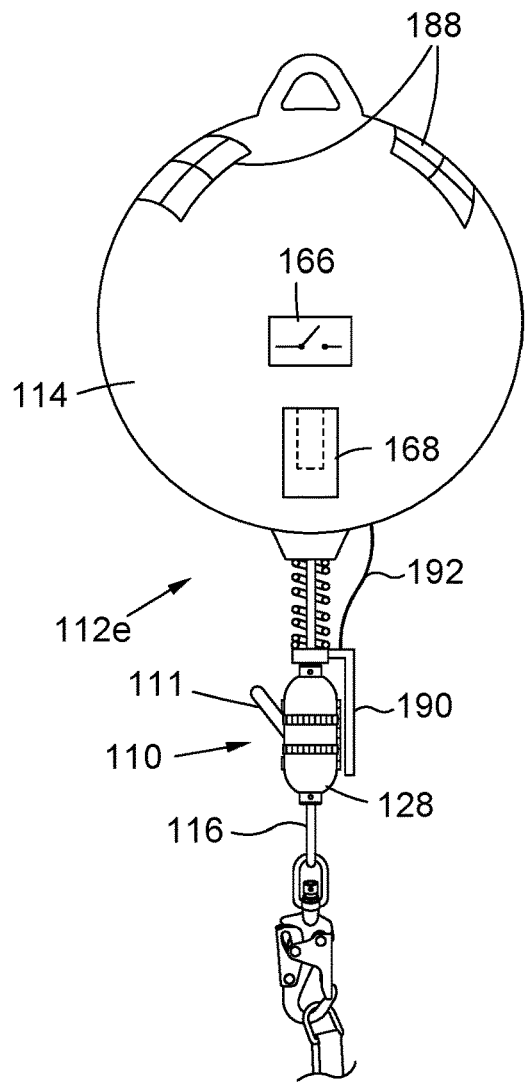
FIG. 22A
FIG. 22B

SELF-RETRACTING LANYARD WITH FALL PROTECTION HARNESS TRACKER

CROSS-REFERENCE TO RELATED APPLICATIONS

This application is a continuation-in-part of U.S. patent application Ser. No. 16/261,151, filed Jan. 29, 2019, which is a continuation-in-part of U.S. patent application Ser. No. 15/817,759, filed Nov. 20, 2017, which is a continuation-in-part of U.S. patent application Ser. No. 15/415,651, filed Jan. 25, 2017, now U.S. Pat. No. 9,852,598, issued Dec. 26, 2017, all of which are incorporated by reference herein in their entireties.

STATEMENT RE: FEDERALLY SPONSORED RESEARCH/DEVELOPMENT

Not Applicable

BACKGROUND

1. Technical Field

The present disclosure relates generally to a self-retracting lanyard, and more specifically to a self-retracting lanyard system with emergency response communication functionality to aid in the rescue of a user after a fall.

2. Description of the Related Art

Fall protection devices, such as self-retracting lanyards, are well known and are commonly used in work environments where an individual may be susceptible from falling from an elevated location. One end of the self-retracting lanyard is typically connected to a harness worn by an individual, while the other end of the self-retracting lanyard is connected to an overhead support structure, such as a rail or beam.

A conventional self-retracting lanyard includes a main body and a retractable line coupled to the main body, with the retractable line having an exposed portion extending out of the main body. The main body and retractable line may be configured to allow the length of the exposed portion to increase or decrease during use of the self-retracting lanyard. In this regard, when the individual connected to the self-retracting lanyard moves about the elevated location, e.g., walking on the roof of a building, the length of the retractable line may continually increase or decrease as the individual moves relative to the main body. A spring biased spool may be located in the main body to allow for such selective lengthening and shortening of the exposed portion of the retractable line. In this regard, the spool may apply a force on the retractable line to keep the retractable line generally taut, while generally not inhibiting the individual's movement, e.g., walking, at the elevated location.

In the event the individual inadvertently falls from the elevated location, the self-retracting lanyard may break the fall to prevent serious injury to the individual. In particular, the self-retracting lanyard may include a braking device operatively coupled to the retractable line, with the braking device being actuatable in response to the individual's fall to restrict further extension of the retractable line from the main body, which in turn, stops the fall of the individual. The actuation of the braking device may be triggered via the individual's inertia during the fall.

Although the self-retracting lanyard may provide protection against severe injury in the event of an inadvertent fall, there remains a desire to prevent such inadvertent fall altogether. Along these lines, the individual may suffer minor physical and/or mental injuries as a result of such fall. For instance, the individual may lose confidence when operating at elevated locations, which may impact the ability of the individual to perform his job. Furthermore, the environment in which the individual is working may be associated with zones or regions that are particularly more prone to injury, such as a location associated with a dangerously hot exhaust. It may be desirable to provide a warning to an individual as the individual approaches such dangerous zone.

Accordingly, there is a need in the art for a device, usable with a self-retracting lanyard which provides a warning to an individual approaching a potentially dangerous location. Various aspects of the present disclosure address this particular need, as will be discussed in more detail below.

Immediately following a fall, the user of a conventional self-retracting lanyard is helplessly suspended from the retractable line and harness. He must rely on another person to rescue him before his harness reduces blood circulation in his legs causing unconsciousness and possible death. This usually takes place within 15 to 20 minutes after the initial fall. So serious is the risk of injury that suspension trauma straps, such as the Suspension Trauma Safety Strap by DBI-SALA® are available to alleviate pressure and improve circulation of the user while suspended. The concern is especially serious when the user is tasked with working alone or the equipment required to rescue him is unavailable.

In light of the urgency with which a user of a self-retracting lanyard must be rescued, various tools are available in the industry to make rescue quicker and easier. One such rescue tool is a controlled descent feature on a self-retracting lanyard such as Ultra-Lok™ RSQ™ Dual-Mode Self-Retracting Lanyard by DBI-SALA®, which features an RSQ™ Engagement Knob on the main body for selecting between Fall Arrest and Descent operating modes of the self-retracting lanyard. The RSQ™ Engagement Knob can be operated by hand or using a specially designed extension pole with a fork style attachment, depending on whether the rescuer is above the suspended user near the main body of the self-retracting lanyard or on the ground below the suspended user. However, in circumstances where the main body of the self-retracting lanyard is inaccessible and the extension pole is not long enough or misplaced, there is no way to operate the RSQ™ Engagement Knob.

Also available are rescue tools that are separate from the self-retracting lanyard, such as harness-based controlled descent devices operated by a ripcord. However, such separate devices greatly increase the per-worker cost of fall safety. Harness-based devices, for example, must replace conventional harnesses. Due to their fabric-based construction and constant contact with the human body and surrounding work areas, harnesses degrade quickly and require frequent replacement. For this reason, conventional harnesses are generally considered "consumables" and have a low price point. A harness-based or other controlled descent device separate from the self-retracting lanyard represents an additional high-price piece of equipment that must be purchased for each worker.

Accordingly, there is a need in the art for a self-retracting lanyard that allows for rescue of a suspended user without the drawbacks associated with known devices. Various aspects of the present disclosure address this particular need, as will be discussed in more detail below.

BRIEF SUMMARY

In accordance with one embodiment of the present disclosure, there is provided a method and apparatus adapted for providing an alert to an individual attached to a self-retracting lanyard when the individual is approaching an unsafe position. In particular, various aspects of the present disclosure relate to measuring an angle of the self-retracting lanyard, relative to a vertical axis, and generating an alert signal when the angle exceeds a preset magnitude.

According to one embodiment, there is provided an alarm device adapted for use with a self-retracting lanyard having a main body and a retractable line coupled to the main body. The alarm device includes a housing adapted to be engageable with the retractable line. The housing defines a detection axis, with the housing being adapted to allow at least a portion of the retractable line to be parallel to the detection axis when the housing is engaged with the retractable line. An inclinometer is coupled to the housing and is adapted to detect a magnitude of an angle between the detection axis and a vertical axis, and generate an electrical signal when the magnitude exceeds a preset threshold. An alarm element is in communication with the inclinometer to receive the electrical signal generated by the inclinometer. The alarm element is adapted to generate an alert signal in response to receipt of the electrical signal.

The housing may be a clam-shell housing including two bodies pivotally coupled to each other. The housing may be adapted to be circumferentially engageable with the retractable line. The housing may include a body and a central channel about which the housing body is located, the housing being adapted to allow the retractable line to reside within the central channel when the housing is engaged with the retractable line. The housing may also be configured to allow at least a portion of the retractable line to extend along detection axis when the housing is engaged with the retractable line.

The preset threshold may be between twenty degrees and forty degrees. The preset threshold may be thirty degrees.

A resilient bushing may be coupled to the housing and disposed about the detection axis.

The alarm element may be adapted to generate a visual signal. The alarm element may include a light strip extending over an outer surface of the housing. The light strip may substantially circumnavigate the detection axis. The alarm element may be adapted to generate an audible signal.

A method of providing an alert to a user coupled to a self-retracting lanyard. The method includes: detecting a magnitude of an angle between a retractable line of the self-retracting lanyard and a vertical axis using an inclinometer, the inclinometer being located within a housing coupled to the retractable line; and generating an alert signal using an alert element when the magnitude exceeds a preset threshold.

The generating step may include generating an alert signal when the magnitude is above twenty degrees. The generating step may include generating an alert signal when the magnitude is equal to thirty degrees.

The method may further comprise the step of imparting an engagement force on the retractable line. The imparting step may include imparting a circumferential engagement force on the retractable line.

In accordance with another aspect of the present disclosure, there are provided apparatuses and methods for initiating controlled descent functionality of a self-retracting lanyard while an individual attached to the self-retracting lanyard is suspended after a fall. In particular, various aspects of the present disclosure relate to providing a manual control operable by the user to initiate a controlled descent mode of the self-retracting lanyard without the assistance of another person.

According to one or more embodiments, there is provided a self-retracting lanyard including a main body and a retractable line. The retractable line is coupled to the main body so as to be extendible and retractable relative to the main body and to be restricted from extending relative to the main body in response to a user of the self-retracting lanyard falling. The self-retracting lanyard further includes a manual control operable by the user to initiate controlled descent of the retractable line relative to the main body.

The self-retracting lanyard may include a housing adapted to be engageable with the retractable line. The manual control may be disposed on the housing. The manual control may include a lever, switch, button, or motion sensor on the housing. The main body may include an actuator arranged to actuate a controlled descent switch that initiates the controlled descent.

The manual control may be operable by the user to generate an electric signal on a signal path extending from the housing to the main body. The actuator may be configured to actuate the controlled descent switch in response to the electric signal. The signal path may include a wire in the retractable line.

The manual control may be operable by the user to generate a pneumatic or hydraulic signal on a signal path extending from the housing to the main body. The actuator may be configured to actuate the controlled descent switch in response to the pneumatic or hydraulic signal. The signal path may include an air pilot hose connected to a valve of a compressed air source of the main body.

The self-retracting lanyard may include a controlled descent actuation line coupled to the main body. The manual control may be disposed on the controlled descent actuation line. The main body may include a cam coupled to the controlled descent actuation line and arranged to engage with a controlled descent switch that initiates the controlled descent. The manual control may be operable by the user to move the controlled descent actuation line so as to cause the cam to engage with the controlled descent switch. The cam may be coupled to the controlled descent actuation line via a spool on which the controlled descent actuation line winds as the retractable line is retracted. The manual control may include a handle with which the user can pull the controlled descent actuation line to initiate the controlled descent.

The self-retracting lanyard may include a non-transitory program storage medium on which are stored instructions executable by a processor or programmable circuit to perform operations including receiving a controlled descent initiation command and instructing a wireless transmitter to transmit a controlled descent initiation signal in response to receipt of the controlled descent initiation command. The manual control may be disposed on a mobile device including the non-transitory program storage medium, the processor or programmable circuit, and the wireless transmitter. The main body may include an actuator arranged to actuate a controlled descent switch that initiates the controlled descent, the actuator including a wireless receiver. The manual control may be operable by the user to generate the controlled descent initiation command. The actuator may be configured to actuate the controlled descent switch in response to receipt of the controlled descent initiation signal by the wireless receiver. The manual control may include a touch screen, button, switch, motion sensor, or camera of the mobile device. The self-retracting lanyard may include a dock for holding the mobile device, the dock adapted to be engageable with the retractable line.

A method according to one or more embodiments includes providing a self-retracting lanyard including a main body and a retractable line coupled to the main body so as to be extendible and retractable relative to the main body and to be restricted from extending relative to the main body in response to a user of the self-retracting lanyard falling. The method further includes attaching the retractable line to a user of the self-retracting lanyard and initiating a controlled descent of the retractable line relative to the main body in response to operation by the user of a manual control of the self-retracting lanyard.

According to one or more embodiments, there is provided a non-transitory program storage medium on which are stored instructions executable by a processor or programmable circuit to perform operations including receiving a controlled descent initiation command in response to operation by a user of a manual control associated with a self-retracting lanyard including a main body and a retractable line coupled to the main body, and instructing a wireless transmitter to transmit a controlled descent initiation signal in response to receipt of the controlled descent initiation command, the controlled descent initiation signal initiating a controlled descent of the retractable line relative to the main body. The non-transitory program storage medium may be included in a mobile device that further includes the processor or programmable circuit and the wireless transmitter.

The mobile device may include the manual control, wherein the manual control includes a touch screen, button, switch, motion sensor, or camera of the mobile device.

The mobile device may be included in an apparatus that further includes a peripheral device connectible to the mobile device and including the manual control, wherein the manual control includes a lever, switch, button, or motion sensor.

In accordance with another aspect of the present disclosure, there are provided apparatuses and methods for communicating with emergency response services or personnel in the event that a worker falls while wearing a self-retracting lanyard. In particular, various aspects of the present disclosure relate to providing a harness-based tracker that initiates a wireless communication in response to a fall.

According to one or more embodiments, there is provided a self-retracting lanyard system including a self-retracting lanyard, a harness, and an electronic device. The self-retracting lanyard may include a main body and a retractable line coupled to the main body so as to be extendible and retractable relative to the main body and to be restricted from extending relative to the main body in response to a user of the self-retracting lanyard falling. The harness may be connected to the retractable line and may be wearable by the user of the self-retracting lanyard. The electronic device may be disposable on the harness and may include an accelerometer, a processor or programmable circuit, and a non-transitory program storage medium on which are stored instructions executable by the processor or programmable circuit to perform operations including receiving a measurement from the accelerometer, comparing the measurement to a threshold, detecting that the user of the self-retracting lanyard has fallen based on a result of the comparing, and instructing a wireless transmitter to transmit a wireless signal in response to the detection that the user has fallen.

The electronic device may further include the wireless transmitter. The electronic device may instruct the wireless transmitter via a short-range data link to an external device that includes the wireless transmitter. The short-range data link may be a short-range wireless connection. The external device may be a smart phone paired with the electronic device over the short-range wireless connection. The instructing may include instructing the wireless transmitter to transmit the wireless signal to one or more contacts on a list of contacts stored in the smart phone.

The self-retracting lanyard system may further include a pocket sized to accommodate the electronic device. The pocket may be formed integrally with the harness. The pocket may include a fastener for removably fixing the pocket to the harness.

The electronic device may further include a manual control operable by the user to generate a controlled descent initiation command for initiating controlled descent of the retractable line relative to the main body. The operations performed by the processor or programmable circuit may further include receiving the controlled descent initiation command and instructing the wireless transmitter to transmit a controlled descent initiation signal in response to receipt of the controlled descent initiation command. The manual control may include a touch screen, button, switch, motion sensor, or camera of the electronic device.

Instructing the wireless transmitter to transmit the wireless signal may include instructing the wireless transmitter to transmit location data associated with the detection that the user has fallen. The electronic device may further include a global positioning system (GPS) for generating the location data. The electronic device may receive the location data via a short-range data link to an external device that includes a global positioning system (GPS). The short-range data link may be a short-range wireless connection. The external device may be a smart phone paired with the electronic device over the short-range wireless connection.

The operations performed by the processor or programmable circuit may further include, in response to the detection that the user has fallen, initiating a countdown during which the user may prevent the electronic device from instructing the wireless transmitter to transmit the wireless signal.

The operations performed by the processor or programmable circuit may further include initiating a fall alarm using a display, a light, and/or a speaker in response to the detection that the user has fallen.

According to one or more embodiments, there is provided a self-retracting lanyard system including a harness connectible to a retractable line of a self-retracting lanyard and wearable by a user of the self-retracting lanyard and an electronic device disposable on the harness. The electronic device may include an accelerometer, a processor or programmable circuit, and a non-transitory program storage medium on which are stored instructions executable by the processor or programmable circuit to perform operations including receiving a measurement from the accelerometer, comparing the measurement to a threshold, detecting that the user of the self-retracting lanyard has fallen based on a result of the comparing, and instructing a wireless transmitter to transmit a wireless signal in response to the detection that the user has fallen.

A method according to one or more embodiments includes disposing an accelerometer on a harness connectible to a retractable line of a self-retracting lanyard and wearable by a user of the self-retracting lanyard, receiving a measurement from the accelerometer, comparing the measurement to a threshold, detecting that the user of the self-retracting lanyard has fallen based on a result of the comparing, and instructing a wireless transmitter to transmit a wireless signal in response to the detection that the user has fallen.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 3 is a front view of the alarm device in an open configuration;

FIG. 4 is an upper perspective view of the alarm device in a closed configuration to secure the alarm device to the retractable line;

FIG. 5 is an upper perspective exploded view of a bushing which forms part of the alarm device to dissipate impact forces imparted on the alarm device;

FIG. 6 is a front sectional view of the bushing depicted in FIG. 5;

FIGS. 11A and 11B are schematic views of the self-retracting lanyard depicting the operation of a manual control to initiate controlled descent of the self-retracting lanyard, with FIG. 11A depicting the self-retracting lanyard before the operation of the manual control and FIG. 11B depicting the self-retracting lanyard after the operation of the manual control;

FIG. 12 is a front view of a manual control housing in an open configuration;

FIG. 13 is an upper perspective view of the manual control housing in a closed configuration to secure the manual control housing to the retractable line;

FIGS. 22A and 22B are schematic views of a self-retracting lanyard according to another embodiment of the innovations described herein, with FIG. 22A depicting the self-retracting lanyard in an extended state and FIG. 22B depicting the self-retracting lanyard in a retracted state.

Common reference numerals are used throughout the drawings and the detailed description to indicate the same elements.

DETAILED DESCRIPTION

The detailed description set forth below in connection with the appended drawings is intended as a description of certain embodiments of an alarm device for a self-retracting lanyard, of a self-retracting lanyard with controlled descent functionality, and of a self-retracting lanyard system with emergency response communication functionality and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure pertain to an alarm device specifically configured and adapted for use with a self-retracting lanyard. Along these lines, it is understood that self-retracting lanyards may be connected to a harness worn by an individual working or otherwise located in a potentially dangerous environment, such as an elevated location associated with a falling hazard. The alarm device may be connected to a retractable line of the self-retracting lanyard to provide an alert to the individual when the individual approaches a particularly unsafe location. Thus, when the individual perceives the alarm, the user may return to a safe position. Accordingly, the alarm device may provide an additional level of protecting to the individual.

Figure 1:
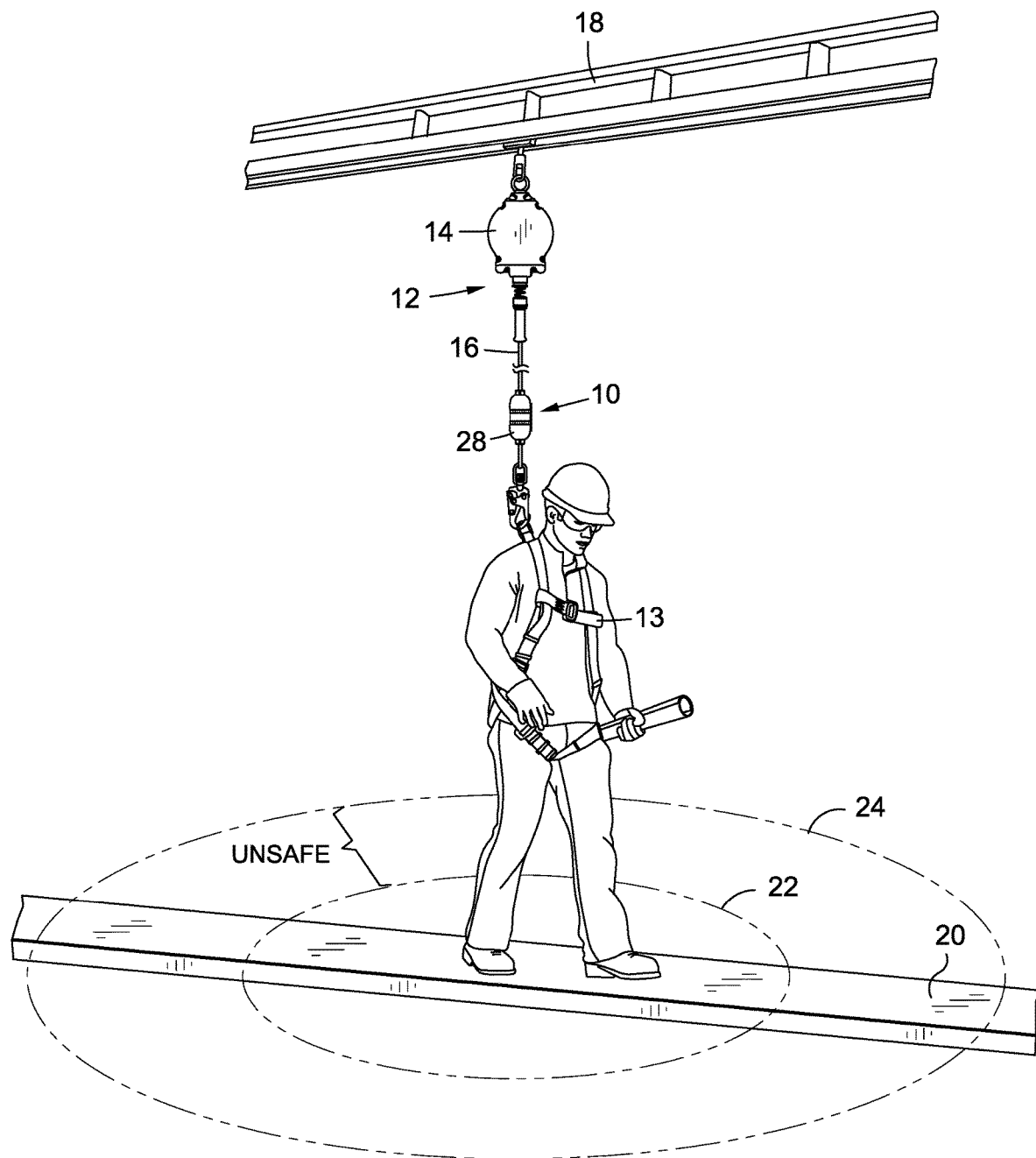
FIG. 1 is a front view of an alarm device coupled to a retractable line of a self-retracting lanyard, the retractable line being in a generally vertical configuration.

Referring now to the drawings, FIG. 1 depicts an exemplary embodiment of an alarm device 10 coupled to a self-retracting lanyard 12. As used herein, the term "self-retracting lanyard" refers to a fall protection device that is attached to a safety harness 13 worn by an individual when the individual is located in an environment, which would cause injury to the individual should the individual inadvertently fall from such environment. For instance, the self-retracting lanyard 12 may be used when located on building scaffolding, on construction sites, on the roof or elevated floor of a building, on top of large machinery, on the outside of large airplanes, or other elevated environments. The terms "retractable lanyard" or "self-retracting lifeline" may also be used to refer to the self-retracting lanyard 12.

According to one embodiment, the self-retracting lanyard 12 includes a main body 14 and a retractable line 16 or lanyard extending from the main body 14. The main body 14 is connected to an overhead support rail 18. In some instances, the main body 14 may be translatable along at least a portion of the support rail 18, while in other instances, the main body 14 is generally fixed relative to the support rail 18 such that the main body 14 cannot translate relative thereto. In the embodiment depicted in FIGS. 1 and 2, the main body 14 can pivot relative to the upper support rail 18, but cannot translate along the support rail 18.

The retractable line 16 may be transitioned relative to the main body 14 between a retracted configuration and an extended configuration, wherein the amount of the line 16 extending out of the main body 14 increases as the retractable line 16 transitions from the retracted configuration to the extended configuration. In this regard, the main body 14 may include a spring-biased spool about which the retractable line 16 is wound. Furthermore, the self-retracting lanyard 12 may be specifically configured to utilize inertia to activate a braking mechanism to protect the individual from the fall. An exemplary self-retracting lanyard 12 is the DEFY™ Self-Retracting Lanyard sold by Rigid Lifelines, the structure and operation of which is expressly incorporated herein by reference, although it is expressly contemplated that other self-retracting lanyards known in the art may be used with the alarm device 10 described herein.

Figure 2:
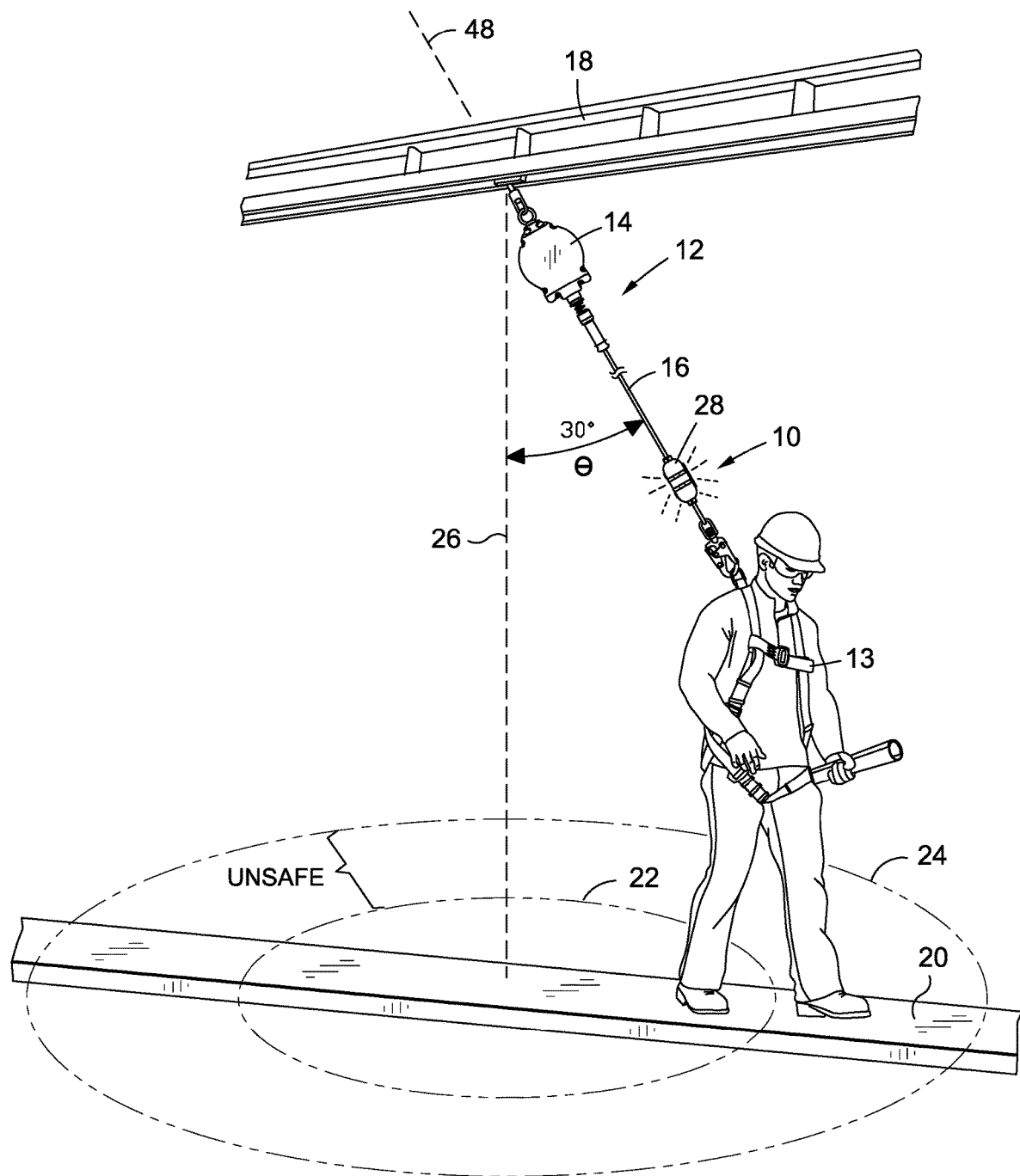
FIG. 2 is a front view of the alarm device, with the retractable line being separated from a vertical axis by an angle associated with an unsafe condition.

FIGS. 1 and 2 depict a user connected to the self-retracting lanyard 12 and located on a platform 20. FIGS. 1 and 2 also depict a safe zone 22 and an unsafe zone 24 on the platform 20. An objective of the alarm device 10 is for the individual to remain on the platform 20 and in the safe zone 22, as shown in FIG. 1. To that end, the alarm device 10 is adapted to provide an alert to the individual should the individual exit the safe zone 22 and enter the unsafe zone 24, as shown in FIG. 2. A comparison of FIGS. 1 and 2 illustrates that the angle of the retractable line 16 relative to a vertical axis 26 increases as the individual transitions from the safe zone 22 to the unsafe zone 24. The importance of this change in angle will be described in more detail below.

According to one embodiment, the alarm device 10 includes a housing 28 adapted to be engageable with the retractable line 16. In the exemplary embodiment, the housing 28 is adapted to be engaged with, or coupled to, the retractable line 16, such that the retractable line 16 passes through the housing 28. Referring now specifically to FIGS. 3 and 4, to effectuate such engagement between the housing 28 and the retractable line 16, the exemplary housing 28 is a clam-shell housing having two bodies 30, 32 pivotally coupled to each other. The bodies 30, 32 are configured to transition between an open configuration, as shown in FIG. 3, and a closed configuration, as shown in FIG. 4 to secure the housing 16 to the retractable line 16. The bodies 30, 32 preferably pivot between the open and closed configurations, with the bodies 30, 32 being coupled via a hinge 34 defining a hinge axis 36. Each body 30, 32 includes a respective edge 38, 40 opposite the hinge 34. As the housing 28 transitions from the open configuration toward the closed configuration, the edges 38, 40 move toward each other to allow complimentary latches 42 or other closing mechanisms to engage with each other to maintain the housing 28 in the closed configuration. To transition the housing 28 from the closed configuration to the open configuration, the latches 42 are disengaged, and the bodies 30, 32 are pivoted about the hinge axis 36 in an opposite direction, which results in the edges 38, 40 moving away from each other, until the bodies 30, 32 reach the configuration shown in FIG. 3. The clam-shell design of the housing 28 allows the alarm device 10 to be selectively placed on the retractable line 16. In this regard, the housing 28 may be easily retro-fitted on existing self-retracing lanyards 12.

The housing 28 includes a channel 44 extending axially therethrough, with the channel 44 being configured to receive the retractable line 16. In the exemplary embodiment, the channel 44 is collectively defined by both housing bodies 30, 32. When the housing 28 is in the closed configuration and the retractable line 16 passes through the channel 44, the housing 28 is circumferentially engaged to the retractable line 16.

The housing bodies 30, 32 may be formed from a polymer material or other materials known by those skilled in the art. Furthermore, the housing 28 may be formed of a weather resistant material, or have a weather resistant coating or covering applied thereto to allow the alarm device 10 to be used outside and endure the elements, e.g., rain, snow, ice, etc.

Disposed within the channel 44 are a pair of bushings 46, which protect the housing bodies 30, 23 as the retractable line 16 is extended and retracted. In particular, the bushings 46 may protect one end of the housing 28 from inadvertent contact with the main body 14 of the self-retracting lanyard 12, and the other end of the housing 28 from inadvertent contact with hardware associated with the safety harness 13 worn by the individual. In this regard, the bushings 46 may be formed of a resilient, shock absorbing material, such as rubber.

According to one embodiment, the bushing 46 is segmented into two bushing bodies 46a, 46b to facilitate placement of the bushing 46 on the retractable line 16. In this regard, both ends of the retractable line 16 may be secured to hardware which may make it difficult to pass an end of the retractable line 16 through the bushing 46 for purposes of connecting the retractable line 16 to the bushing 46. Therefore, the segmented configuration of the bushing 46 allows the bushing 46 to be more easily attached to the retractable line 16. To that end, each bushing body 46a, 46b may include a pair of apertures 47 which are aligned with a pair of corresponding apertures 47 formed on the other bushing body 46a, 46b. When the apertures 47 are aligned, the apertures 47 are adapted to receive a pair of screws or other fasteners for securing the bushing bodies 46a, 46b together. The bushing 46 may include an aperture 47 which may accommodate a set screw or other securing device for effectuating engagement between the bushing bodies 46a, 46b. In this regard, one of the bushing bodies 46a, 46b may include internal threads to engage with the fastener/screw. When the bushing bodies 46a, 46b are connected to each other about the retractable line 16, the bushing bodies 46a, 46b may impart a circumferential force on the retractable line 16 to secure the bushing 46 to the retractable line 16.

As shown in FIGS. 3, 5, and 6, one embodiment of the bushing 46 includes an outer surface defining a stepped configuration, which is complimentary to a stepped configuration of the channel 44 to facilitate engagement between the bushing 46 and the housing 28. In particular, one end portion of the bushing 46 defines a first outer diameter $OD_1$, while a second end portion of the bushing 46 defines a second outer diameter $OD_2$ less than the first outer diameter $OD_1$. The first and second end portions are separated by a shoulder 49 which extends between the first and second outer diameters $OD_1$, $OD_2$. The bushing 46 also includes an inner diameter ID that is sized to allow the retractable line 16 to extend therethrough, while at the same time creating friction, i.e., an engagement force, between the bushing 46 and the retractable line 16. In this regard, each bushing 46 is sized to be compatible with a retractable line 16 having a specific diameter. Thus, the bushings 46 may be interchanged with different bushings 46 having inner diameters compatible with a specific sized retractable line 16. In this regard, the outer configuration of the bushings 46 may remain constant to allow for universal adaptation with a common housing 28.

The housing 28 defines a detection axis 48, with the housing 28 being adapted to allow at least a portion of the retractable line 16 to be parallel to the detection axis 48 when the housing 28 is engaged with the retractable line 16. Preferably, and as shown in FIG. 4, a portion of the retractable line 16 extends along the detection axis 48 when the housing 28 is engaged with the retractable line 16, although the scope of the present disclosure is not limited thereto. In the exemplary embodiment, the detection axis 48 is defined by the channel 44 which receives the retractable line 16, with the channel 44 being disposed about the detection axis 48 when the bodies 30, 32 are in the closed configuration.

Figure 7:
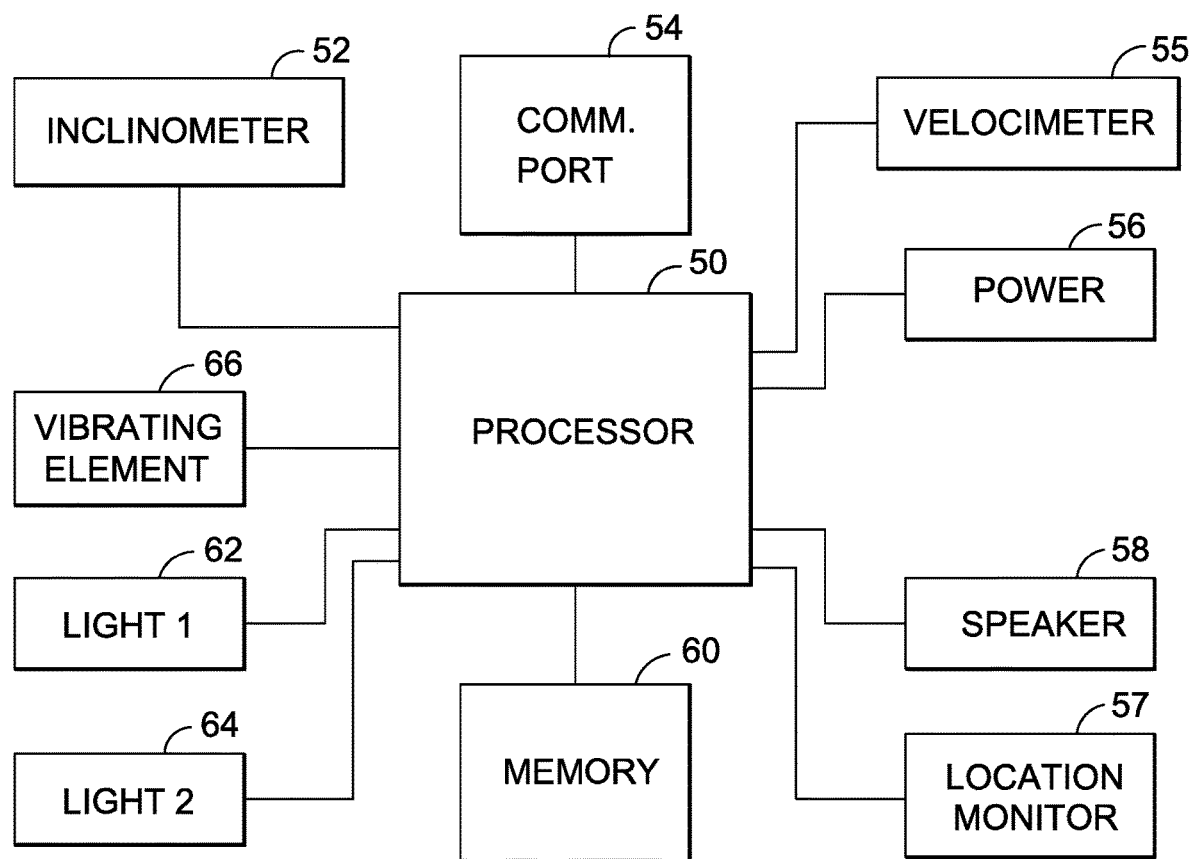
FIG. 7 is a schematic diagram of electrical components of the alarm device.

Reference is now made to FIG. 7, which is an exemplary schematic depiction The alarm device 10 includes several electrical components, including a processor 50, an inclinometer 52, a communication port 54, a power element 56, a speaker 58, a memory module 60, a first alarm light 62, a second alarm light 64, and a vibrating alarm element 66.

The processor 50 is preferably located within the housing 28 and is adapted to provide the computing ability to interface the various electrical components with each other, and also implement the functionality described herein.

The inclinometer 52 is in electrical communication with the processor 50 and is preferably located within the housing 28. The inclinometer 52 is configured to measure a magnitude of an angle, $\Theta$, between the detection axis 48 and a vertical axis 26. In this regard, the inclinometer 52 is used to measure an angle of tilt of the retractable line 16. The inclinometer 52 is further configured to generate an electrical signal when the magnitude of the angle $\Theta$ (e.g., tilt) exceeds a preset threshold.

According to one embodiment, the preset threshold may be between twenty degrees and forty degrees, and more specifically may be thirty degrees. It is contemplated that any preset threshold may be associated with a tolerance, such that the inclinometer 52 may determine that the preset threshold is met when the measurement is within a couple degrees of the preset threshold. The tolerance may be an industry accepted tolerance, although in one particular embodiment, the tolerance may be as large as +/−5 degrees.

It is contemplated that the preset threshold may be set at a manufacturing facility, and thus, the device 10 may be configured such that it does not readily allow an individual to modify the preset threshold. Restricting the ability to readily change the preset threshold may provide additional safety and ensure that the alarm device 10 is operating as an employer intends. However, it is also contemplated that other embodiments of the alarm device 10 may be configured to allow for variation of the preset threshold by the user. User adjustment may be effectuated through adjustment buttons (not shown) integrated into the alarm device 10, or through another user interface known by those skilled in the art.

As noted above, the alarm device 10 includes speaker 58, first alarm light 62, second alarm light 64, and vibrating alarm element 66 each of which may be generally referred to individually or collectively as an "alarm element." In this regard, the speaker 58 is adapted to provide an audible alert to the user or nearby co-worker, while the first and second alarm lights 62, 64 are adapted to provide visual alerts to the user or nearby co-worker, and the vibrating alarm element 66 is adapted to provide a vibratory or touch sensitive alarm to the user. The alerts provided by the speaker 58, first alarm light 62, second alarm light 64, and vibrating alarm element 66 may continue for as long as angle detected by the inclinometer 52 meets or exceeds the preset threshold. Alternatively, the alerts may be generated only once for each time the inclinometer 52 detects an angle that meets or exceeds the preset threshold, with the inclinometer 52 requiring a "reset" by detecting an angle below the preset threshold before generating another actuating signal.

Each of the speaker 58, first alarm light 62, second alarm light 64, and vibrating alarm element 66 are in operative communication with the inclinometer 52 to receive the electrical signal generated by the inclinometer 52 when the inclinometer 52 detects the magnitude of the angle as satisfying the preset threshold. The speaker 58, first alarm light 62, second alarm light 64, and vibrating alarm element 66 are adapted to generate respective alert signals in response to receipt of the electrical signal.

As shown in the schematic diagram the speaker 58, first alarm light 62, second alarm light 64, and vibrating alarm element 66 are in electrical communication with the processor 50, and as such, the speaker 58, first alarm light 62, second alarm light 64 and vibrating alarm element 66 may "receive" the electrical signal generated by the inclinometer 52 via the processor 50. In other words, the electrical signal may be generated by the inclinometer 52 and transmitted to the processor 50, which in turn communicates an actuation signal to the speaker 58, first alarm light 62, second alarm light 64, and vibrating alarm element 66. Alternatively, the inclinometer 52 may communicate directly with the speaker 58, first alarm light 62, second alarm light 64, and vibrating alarm element 66.

The speaker 58 may be coupled to the housing 28 and is adapted to generate an audible alert when the preset threshold is met. The audible alert may include a series of beeps, a long continuous alert, or other audible alert signals known in the art. The audible alert may be heard by the individual wearing the harness 13 and/or by a nearby co-worker who may be able to communicate with the individual to return to the safe zone 22.

According to one embodiment, the first alarm light 62 and second alarm light 64 are each comprised of an arcuate light strip extending over an external surface of the housing 28. The first and second alarm lights 62, 64 may be viewed by the individual in the harness 13 and/or by a co-worker who can provide assistance. The first and second alarm lights 62, 64 extend substantially 360 degrees about the detection axis 48. It is understood that the alarm lights 62, 64 may not extend completely 360 degrees in order to account for the clam-shell design of the housing 28. In this regard, the lights 62, 64 may be disrupted at the interface of the housing bodies 30, 32.

The alarm lights 62, 64 may generate a wide variety of visual alarms known in the art. For instance, the alarm lights 62, 64 may generate different colors, different blinking patterns, constant light emission, etc.

Since the alarm device 10 may be used in loud environments, it is understood that the audible alert provide by the speaker 58 may not be heard. Furthermore, in many instances, the first and second alarm lights 62, 64 may be located behind the individual in the harness 13, and thus, the visual alarms may not be readily perceived. Therefore, the vibrating alarm element 66 is intended to provide an alert which may be more readily perceived by the individual. In this regard, when the inclinometer 52 generates the electrical signal associated with the unsafe condition, the vibrating element 66 may begin vibrating, with such vibrations being communicated along the retractable line 16 such that the vibrations are sensed by the individual.

The alarm device 10 may also include a velocimeter 55 to measure the velocity of the alarm device 10 and location monitor 57 to measure the location of the alarm device 10 as it moves. The measured velocity and location data may be stored in the memory module 60 for subsequent review. Such measured velocity and location data may be desirable to review in the event the individual inadvertently falls from the elevated location, so as to allow for analysis of data associated with the fall.

In addition to storing data generated by the velocimeter 55 and location monitor 57, the memory module 60 may also be configured to store data generated by the inclinometer 52. Such data may be retrieved through the communication port 54, which may be a physical port, such as a USB-port, to allow the data on the memory module 60 to be downloaded to a remote electronic device. It is also contemplated that the communication ort 54 may be capable of wireless communication, such as WiFi or Bluetooth™ communication, thereby allowing wireless downloading of the data from the memory module 60.

The electrical components receive power from a power module 56, i.e., battery, located in the housing 28. The distribution of power from the battery 56 may be governed by the processor 50.

With the basic structural features of the alarm device 10 being described above, an exemplary use of the alarm device 10 is provided below.

An alarm device 10 is connected to the retractable line 16 of the self-retracting lanyard 12. In one embodiment, the alarm device 10 is adapted to frictionally engage the retractable line 16, and apply a circumferential force thereon to substantially restrict movement of the alarm device 10 along the retractable line 16.

In one embodiment, the alarm device 10 may be transitional between ON and OFF modes, and thus, the user may transition the device 10 from the OFF mode to the ON mode. Such transition may occur automatically upon detection of movement of the alarm device 10, e.g., detection of changes of inclination by the inclinometer, or alternatively, the individual may actuate a button or other actuator to cause such transition.

With the alarm device 10 ON, the individual performs his work at the elevated location. As the individual moves along the platform 20, the inclinometer 52 detects the magnitude of an angle between a retractable line 16 of the self-retracting lanyard 12 and the vertical axis. The inclinometer generates a signal when the detected magnitude exceeds a preset threshold. That signal is then communicated to an alert element, such as the speaker 58, first light alarm 62, second light alarm 64 and/or vibrating alarm element 66. The alarm element then emits a signal to provide an alert to the user that the user is in an unsafe location, and to return to a safer zone or region.

Thus, when the individual attached to the self-retracting lanyard 12 perceives the emitted signal, whether audibly, visually or through touch-sensation, or a nearby co-worker hears or views the signal, the individual may be made aware of the potentially dangerous condition, and can return to safety, which mitigates likelihood of harm from fall or other dangerous conditions. Along these lines, although it is contemplated that the unsafe zone or region may be associated with an increased likelihood of fall, it may be associated with other hazards, such as temperature hazards, chemical hazards, etc.

Various aspects of the present disclosure pertain to a self-retracting lanyard with a user actuated controlled descent functionality. As described above, it is understood that self-retracting lanyards may be connected to a harness worn by an individual working or otherwise located in a potentially dangerous environment, such as an elevated location associated with a falling hazard. The self-retracting lanyard may include a manual control that is operable/actuable by the user of the self-retracting lanyard to initiate controlled descent. When the user of the self-retracting lanyard experiences a fall and is dangerously suspended by the self-retracting lanyard and harness, the user may self-operate/actuate the manual control without assistance to safely lower himself to the ground. The self-retracting lanyard with controlled descent functionality may or may not further include the alarm device described above in relation to FIGS. 1-7. Similarly, the alarm device of FIGS. 1-7 may be used with a self-retracting lanyard with controlled descent functionality as described below.

Figure 8:
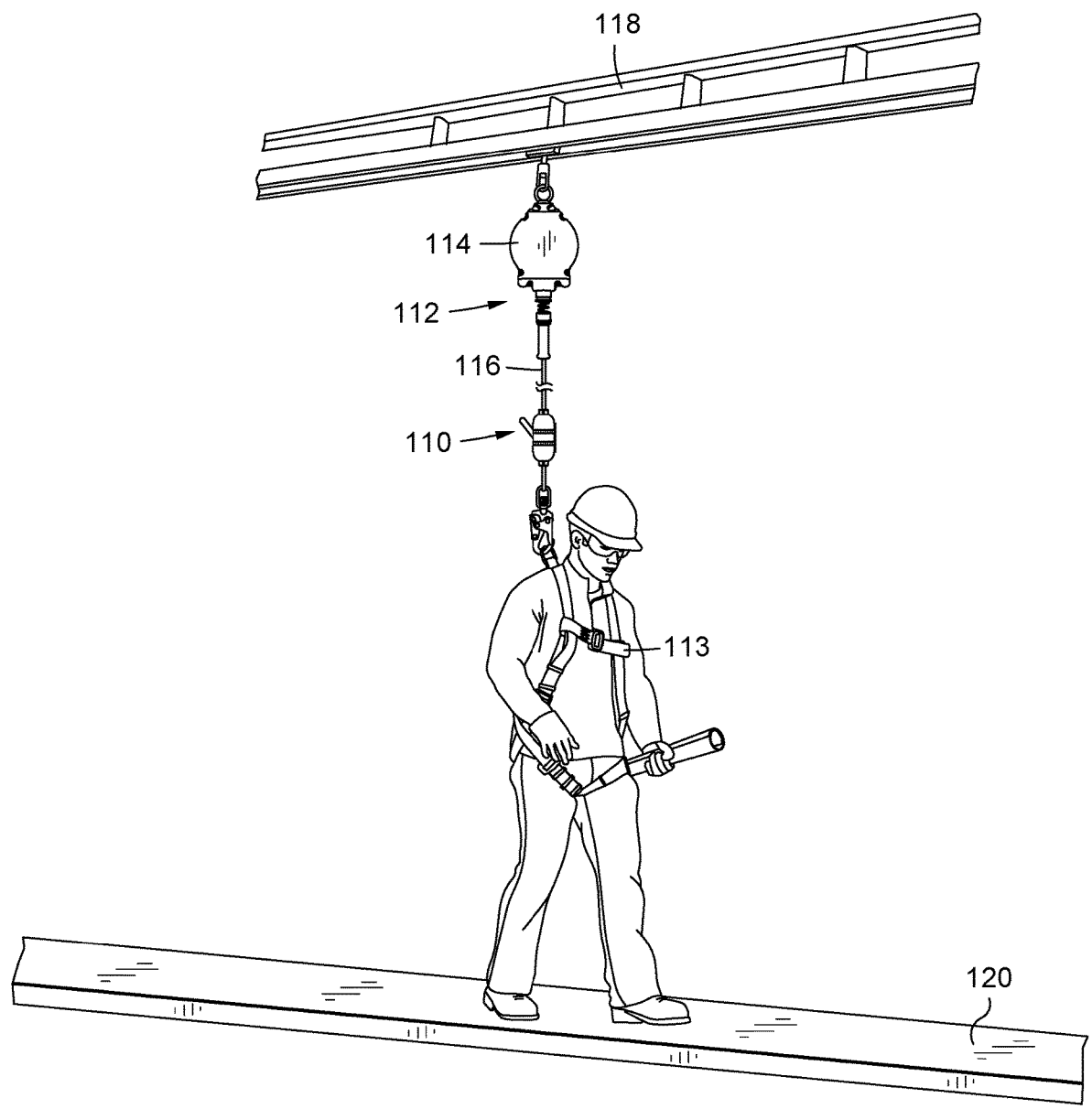
FIG. 8 is a front view of a self-retracting lanyard with controlled descent functionality, the retractable line being in a generally vertical configuration.
Figure 9:
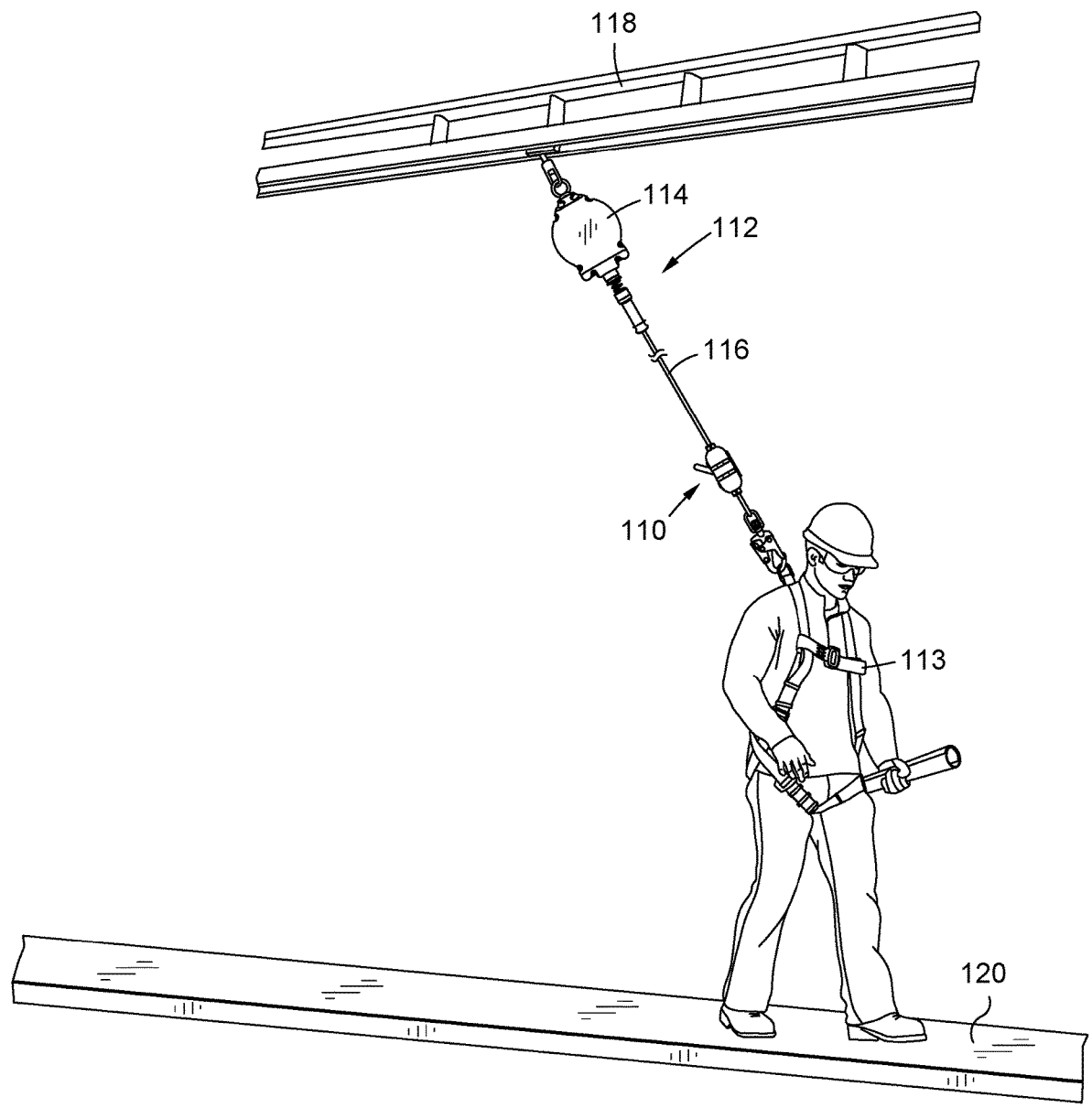
FIG. 9 is a front view of the self-retracting lanyard with controlled descent functionality with the retractable line having extended to accommodate the position of the user.
Figure 10:
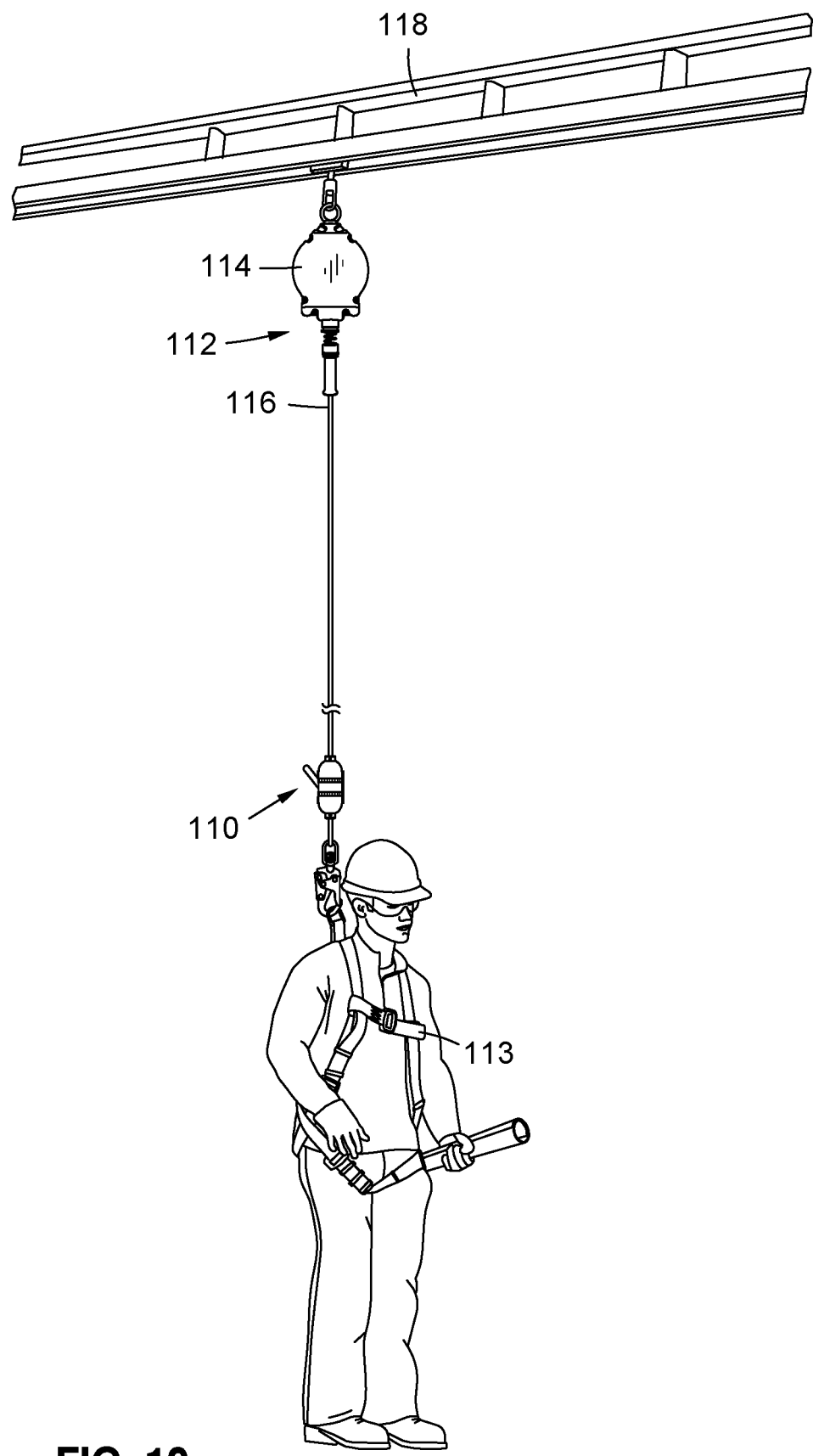
FIG. 10 is a front view of the self-retracting lanyard with the user of the self-retracting lanyard suspended after a fall, the retractable line restricted from extending relative to the main body.

Referring again to the drawings, FIGS. 8-10 depict an exemplary embodiment of a self-retracting lanyard 112. As used herein, the term "self-retracting lanyard" refers to a fall protection device that is attached to a safety harness 113 worn by an individual when the individual is located in an environment, which would cause injury to the individual should the individual inadvertently fall from such environment. For instance, the self-retracting lanyard 112 may be used when located on building scaffolding, on construction sites, on the roof or elevated floor of a building, on top of large machinery, on the outside of large airplanes, or other elevated environments. The terms "retractable lanyard" or "self-retracting lifeline" may also be used to refer to the self-retracting lanyard 112.

According to one embodiment, the self-retracting lanyard 112 includes a main body 114, a retractable line 116 or lanyard extending from the main body 114, and a manual control 110. The main body 114 is connected to an overhead support rail 118. In some instances, the main body 114 may be translatable along at least a portion of the support rail 118, while in other instances, the main body 114 is generally fixed relative to the support rail 118 such that the main body 114 cannot translate relative thereto. In the embodiment depicted in FIGS. 8-10, the main body 114 can pivot relative to the upper support rail 118, but cannot translate along the support rail 118.

Just as the retractable line 16 of FIGS. 1-7 may be transitioned relative to the main body 14, the retractable line 116 may be transitioned relative to the main body 114 between a retracted configuration and an extended configuration, wherein the amount of the retractable line 116 extending out of the main body 114 increases as the retractable line 116 transitions from the retracted configuration to the extended configuration. In this regard, just like the main body 14, the main body 114 may include a spring-biased spool about which the retractable line 116 is wound. Furthermore, the self-retracting lanyard 112 may be specifically configured to utilize inertia to activate a braking mechanism to protect the individual from the fall. As such, the retractable line 116 may be coupled to the main body 114 so as to be extendible and retractable relative to the main body 114 and to be restricted from extending relative to the main body 114 in response to the user of the self-retracting lanyard 112 falling. An exemplary self-retracting lanyard 112 is the DEFY™ Self-Retracting Lanyard sold by Rigid Lifelines, the structure and operation of which is expressly incorporated herein by reference, although it is expressly contemplated that other self-retracting lanyards known in the art may be used with the innovations described herein.

FIGS. 8 and 9 depict a user connected to the self-retracting lanyard 112 and located on a platform 120. A comparison of FIGS. 8 and 9 illustrates that, even with a fixed anchor point of the main body 114 on the upper support rail 118, the user of the self-retracting lanyard 112 may freely move within a range of the main body 114 as the retractable line 116 extends and retracts to accommodate the position of the user.

FIG. 10 depicts the same user after a fall, with the retractable line 116 restricted from extending relative to the main body 114. As shown, the user is suspended by the self-retracting lanyard 112 and harness 113. The user has been saved from a falling injury but remains vulnerable to suspension trauma or other injury caused by being stuck in a suspended position. In the example of FIG. 10, the platform 120 has fallen and is no longer near the suspended worker. In this situation, there is no possibility of another worker pulling the suspended worker back up onto the platform 120. In other situations, the platform 120 may remain but may be inaccessible to other workers or there may be no other workers present, making an assisted rescue difficult or impossible. In accordance with the innovations described herein, the suspended worker himself may reach above his head and operate the manual control 110, thereby initiating controlled descent of the retractable line 116 relative to the main body 114 of the self-retracting lanyard 112. In this way, a user of the self-retracting lanyard 112 may gradually lower himself to the ground without assistance.

FIGS. 11A and 11B are schematic views of the self-retracting lanyard 112 depicting the operation of a manual control 110 to initiate controlled descent of the self-retracting lanyard 112. As schematically shown, the main body 114 of the self-retracting lanyard 112 may include a controlled descent switch 166 for transitioning the self-retracting lanyard 112 into a controlled descent mode. In the controlled descent mode, the retractable line 116 may become free to move relative to the main body 114 in a controlled or otherwise slowed manner to allow a safe descent. The controlled descent switch 166 may transition the self-retracting lanyard 112 to a controlled descent mode from a fall arrest mode or normal mode in which the retractable line 116 is restricted from extending relative to the main body 114 in response to a fall (e.g. a braking mechanism is activated in response to the user's inertia). The controlled descent switch 166 may be, for example, an RSQ™ Engagement Knob of an Ultra-Lok™ RSQ™ Dual-Mode Self-Retracting Lanyard by DBI-SALA® or an internal mechanism engaged by operation of the RSQ™ Engagement Knob, with the two modes corresponding to the Descent and Fall Arrest operating modes thereof, the structure and operation of which is expressly incorporated herein by reference.

In some cases, the controlled descent switch 166 may transition the self-retracting lanyard 112 from a fall arrest mode to a controlled descent mode and back to the fall arrest mode. With such a configuration, the user may freely switch from fall arrest mode to controlled descent mode and back again to fall arrest mode by operation of the manual control 110. For example, in the illustrated example where the manual control 110 includes a lever 111 disposed on a manual control housing 128, the user may switch from fall arrest mode to controlled descent mode and back again to fall arrest mode by alternately pulling and releasing the lever 112 (or by alternately pulling and pushing the lever 112). This may be useful in a situation where the user wishes only to lower himself to an intermediate level where other workers might be near enough to his path of descent to assist him. Alternatively, the controlled descent switch 166 may unidirectionally transition the self-retracting lanyard 112 to the controlled descent mode. In this case, the controlled descent mode may cause the retractable line 116 to continue extending until it reaches an unusable fully extended state, or the controlled descent mode may irreversibly disable the braking mechanism, with the self-retracting lanyard 112 having to be reset before being used again (e.g. by a qualified technician in charge of maintaining the self-retracting lanyard 112).

The main body 114 may further include an actuator 168 arranged to actuate the controlled descent switch 166. In the example of FIGS. 11A and 11B, the actuator 168 receives an electric signal upon the operation of the manual control 110. In this case, the actuator 168 may be a linear solenoid as schematically depicted, a rotary solenoid, or any other device that can convert an electric signal into a mechanical motion to actuate the controlled descent switch 166. The manual control 110 is operable to generate an electric signal on a signal path extending from the manual control housing 128 to the main body 114. When the user of the self-retracting lanyard 112 reaches up above his head and operates the manual control 110 (e.g. pulls the lever 111 to a down position), an electric signal is generated at the manual control housing 128 and received by the main body 114 (e.g. by the actuator 168) via the signal path. The actuator 168 is configured to actuate the controlled descent switch 166 in response to the electric signal. The signal path may include, for example, a wire 170 in the retractable line 116 (e.g. an internal conductor of a load cable) and a slip ring arrangement within the main body 114 to carry the electric signal to the actuator 168. The electric signal is schematically illustrated by arrows in FIG. 11B.

In a case where the controlled descent switch 166 is operable to transition the self-retracting lanyard 112 bidirectionally between a fall arrest mode and a controlled descent mode, the manual control 110 may further be operable to cease generation of the electric signal (e.g. when the lever 111 is pushed to an up position or when the lever 111 is released). In such case, the actuator 168 may be spring biased so as to cease actuation of the controlled descent switch 166 when no longer receiving the electric signal.

In the illustrated example, operation of the manual control 110 is accomplished by means of a lever 111 on the manual control housing 128. More generally, the manual control 110 may include any kind of switch or button on the manual control housing 128. In some cases, the manual control 110 may support touchless operation and may include, for example, a motion sensor on the manual control housing 128. The user may operate such a manual control 110 simply by reaching up and putting a hand near the manual control housing 128. Inadvertent initiation of controlled descent mode may be avoided, for example, by configuring the braking mechanism to cause the controlled descent switch 166 (e.g. by means of an electric signal) to enter an active mode in which initiating controlled descent mode is possible. While not in the active mode (e.g. before a fall), the controlled descent switch 166 may be actuated by the actuator 168 with no effect. Once in the active mode (e.g.

after a fall), actuation by the actuator 168 may cause the controlled descent switch 166 to initiate controlled descent mode.

According to one embodiment, the manual control housing 128 is adapted to be engageable with the retractable line 116 in substantially the same way that the housing 28 described above may be engageable with the retractable line 16 (see FIGS. 3-6). In the exemplary embodiment, the manual control housing 128 is adapted to be engaged with, or coupled to, the retractable line 116, such that the retractable line 116 passes through the manual control housing 128. Referring now specifically to FIGS. 12 and 13, to effectuate such engagement between the manual control housing 128 and the retractable line 116, the exemplary manual control housing 128 is a clam-shell housing having two bodies 130, 132 pivotally coupled to each other. The bodies 130, 132 are configured to transition between an open configuration, as shown in FIG. 12, and a closed configuration, as shown in FIG. 13 to secure the manual control housing 128 to the retractable line 116. The bodies 130, 132 preferably pivot between the open and closed configurations, with the bodies 130, 132 being coupled via a hinge 134 defining a hinge axis 136. Each body 130, 132 includes a respective edge 138, 140 opposite the hinge 134. As the manual control housing 128 transitions from the open configuration toward the closed configuration, the edges 138, 140 move toward each other to allow complimentary latches 142 or other closing mechanisms to engage with each other to maintain the manual control housing 128 in the closed configuration. To transition the manual control housing 128 from the closed configuration to the open configuration, the latches 142 are disengaged, and the bodies 130, 132 are pivoted about the hinge axis 136 in an opposite direction, which results in the edges 138, 140 moving away from each other, until the bodies 130, 132 reach the configuration shown in FIG. 12.

The manual control housing 128 may include a channel 144 extending axially therethrough, with the channel 144 being configured to receive the retractable line 116. In the exemplary embodiment, the channel 144 is collectively defined by both housing bodies 130, 132. When the manual control housing 128 is in the closed configuration and the retractable line 116 passes through the channel 144, the manual control housing 128 is circumferentially engaged to the retractable line 116.

Disposed within the channel 144 are a pair of bushings 146, which keep the manual control housing 128 in place as the retractable line 116 is extended and retracted. In some cases, the bushings 146 may also protect one end of the manual control housing 128 from inadvertent contact with the main body 114 of the self-retracting lanyard 112, and the other end of the manual control housing 128 from inadvertent contact with hardware associated with the safety harness 113 worn by the individual. In this regard, the bushings 146 may be formed of a resilient, shock absorbing material, such as rubber.

According to one embodiment, the bushing 146 is segmented into two bushing bodies 146a, 146b. The bushing 146 and bushing bodies 146a, 146b may have substantially the same structure and function in relation to the manual control housing 128 and retractable line 116 as the bushing 46 and bushing bodies 46a, 46b have in relation to the housing 28 and retractable line 16 (see FIGS. 3-6).

The clam-shell design of the manual control housing 128 allows the manual control housing 128 to be selectively placed on or removed from the retractable line 116. To this end, the wire 170 may terminate in a connector 172 that protrudes outside the retractable line 116. When the manual control housing 128 having the clam-shell design is positioned on the retractable line 116, the connector 172 may be plugged into a corresponding connector on the interior of the manual control housing 128 or on a circuit board or electronics sub-housing within the manual control housing 128. In this way, the manual control housing 128 may be configured to be assembled to and disassembled from the self-retracting lanyard 112 (e.g. for use on more than one self-retracting lanyard 112). Additionally, the wire 170 may be designed to protrude some distance outside the retractable line 116 in order to accommodate a range of positions along the retractable line 116 that the manual control housing 128 may be assembled. The manual control housing 128 may include a space or spool for excess slack in the external portion of the wire 170. Alternatively, the manual control housing 128 may not have the clam-shell design or the connector 172 and may be permanently fitted on the retractable line 116 of the self-retracing lanyard 112.

The housing bodies 130, 132 may be formed from a polymer material or other materials known by those skilled in the art. Furthermore, the manual control housing 128 may be formed of a weather resistant material, or have a weather resistant coating or covering applied thereto to allow the internal components of the manual control housing 128 to be used outside and endure the elements, e.g., rain, snow, ice, etc.

Figure 14:
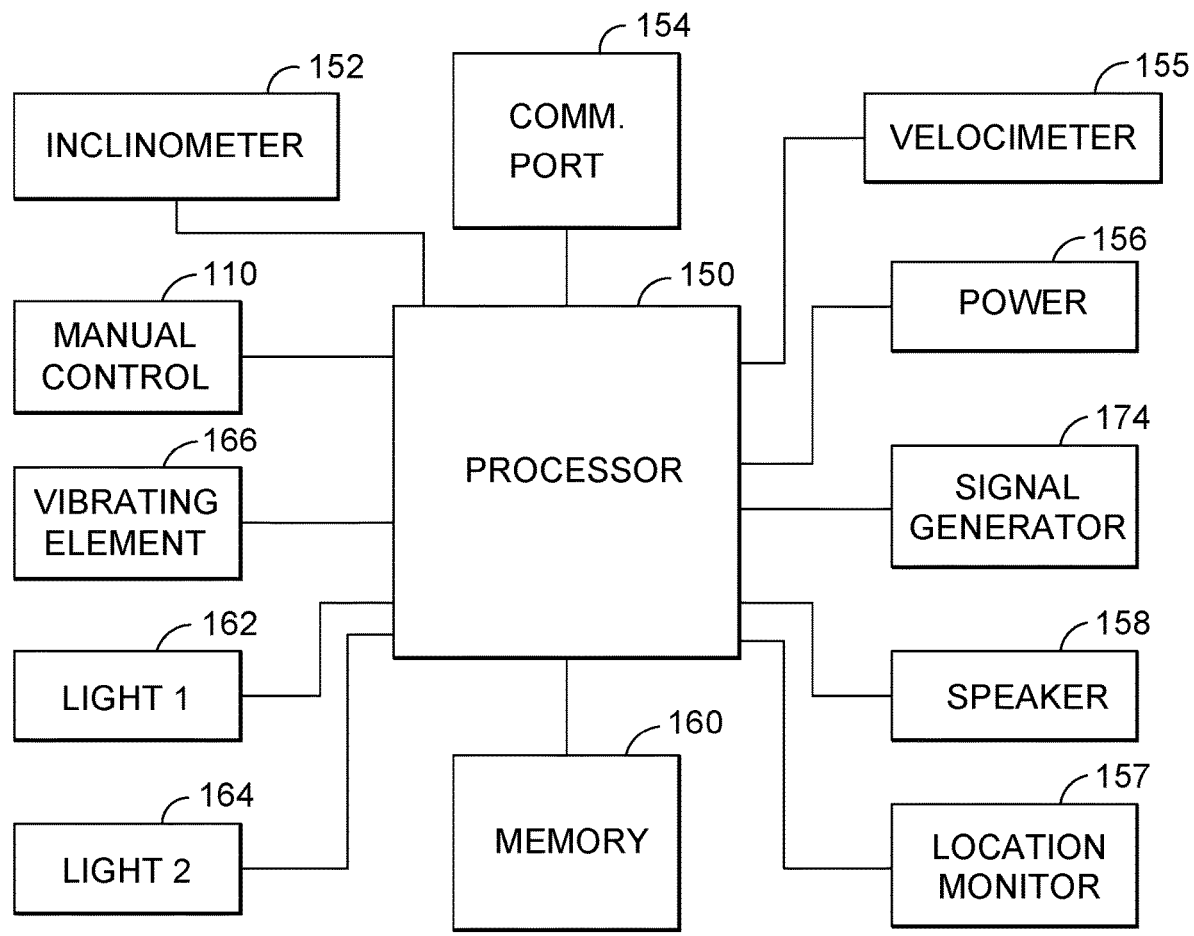
FIG. 14 is a schematic depiction of the manual control housing including functionality that may be embodied in a combination of dedicated circuitry, programmable circuitry, and/or one or more computer component(s) included in the manual control housing together with associated input/output devices.

Reference is now made to FIG. 14, which is an exemplary schematic depiction of the manual control housing 128 including functionality that may be embodied in a combination of dedicated circuitry, programmable circuitry, and/or one or more computer component(s) included in the manual control housing 128 together with associated input/output devices. As noted above, the self-retracting lanyard 112 may include the alarm device 10 described above in relation to FIGS. 1-7. In this regard, the manual control housing 128 may include a processor 150, inclinometer 152, communication port 154, velocimeter 155, battery or other power supply element 156, location monitor 157, speaker 158, memory 160, first alarm light 162, second alarm light 164, and vibrating element 166 having substantially the same structural relationship and functionality as the processor 50, inclinometer 52, communication port 54, velocimeter 55, power element 56, location monitor 57, speaker 58, memory 60, first alarm light 62, second alarm light 64, and vibrating element 66 described above in relation to FIG. 7. Instead, or additionally, the manual control housing 128 may include components related to the operation of the manual control 110. For example, the manual control housing 128 may include a signal generator 174 for generating the electric signal on the wire 170 in response to the operation of the manual control 110. The signal generator 174 may be, for example, a signal generating circuit connected directly to the manual control 110 or to the processor 150, where the processor 150 may issue a signal generation command in response to the operation of the manual control 110. In the latter case, software instructions for issuing the signal generation command in response to the output of the manual control 110 may be stored on the memory 160.

Figure 15:
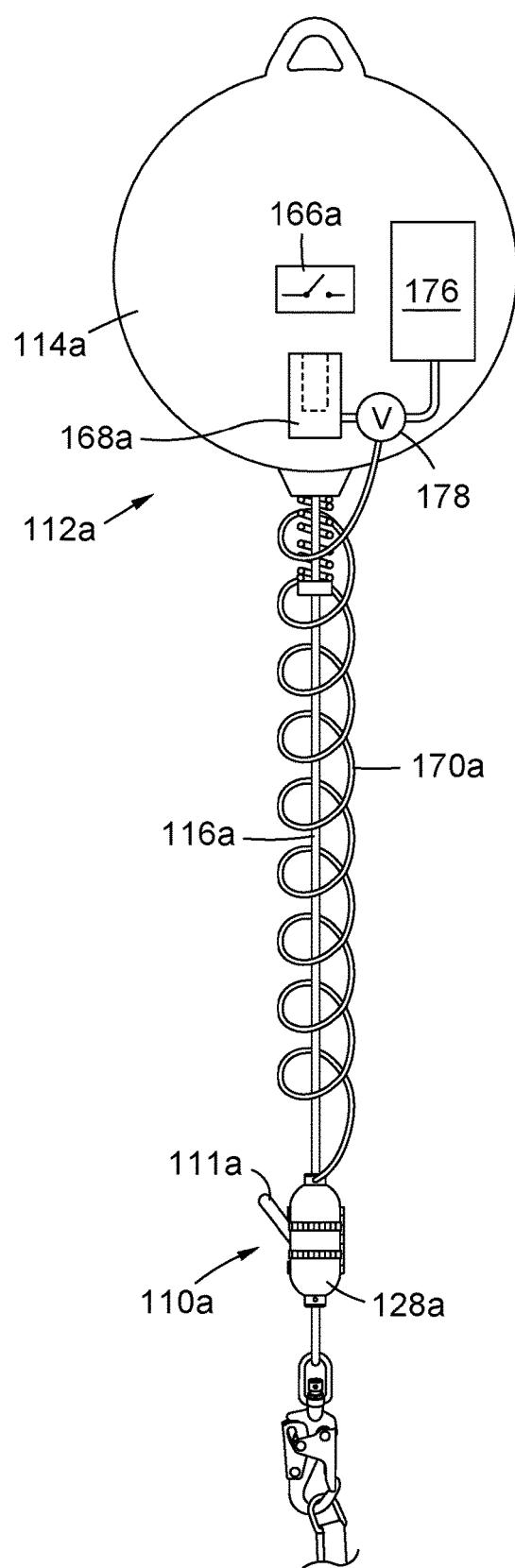
FIG. 15 is a schematic view of another self-retracting lanyard with controlled descent functionality.

FIG. 15 is a schematic view of a self-retracting lanyard 112a according to another embodiment of the innovations described herein. The self-retracting lanyard 112a may be substantially the same as the self-retracting lanyard 112 described above, including a main body 114a with a controlled descent switch 166a, a retractable line 116a, and a manual control 110a that are substantially the same as the main body 114 with controlled descent switch 166, retractable line 116, and manual control 110 of FIGS. 8-14, with the following differences. Whereas the actuator 168 of the self-retracting lanyard 112 converts a received electric signal into a mechanical motion to actuate the controlled descent switch 166, the actuator 168a converts an increased air pressure or other fluid pressure into mechanical motion to actuate the controlled descent switch 166a. To this end, the actuator 168a is fluidly connected to a fluid supply 176 (e.g. a compressed air source) of the main body 114a by a pneumatically or hydraulically operated valve 178. The fluid supply 176 may include an internal reservoir of fluid disposed within the main body 114a or a connection to an external reservoir of fluid. Whereas the manual control 110 is operable to generate an electric signal, the manual control 110a is operable to generate a pneumatic or hydraulic signal on a signal path such as a pilot hose 170a extending from the manual control housing 128a to the main body 114a, e.g. to the valve 178 of the fluid supply 176.

When the user of the self-retracting lanyard 112a reaches up above his head and operates the manual control 110a (e.g. pulls a lever 111a to a down position), a pneumatic or hydraulic signal is generated at the manual control housing 128a and received by the main body 114a via the signal path. The pneumatic or hydraulic signal may be, for example, a slight increase in pressure inside the pilot hose 170a caused by the lever 111a or other manual control 110a depressing a plunger that is fluidly coupled to the pilot hose 170a inside the manual control housing 128a. In response to the signal, the valve 178 may open, allowing air or other fluid from the fluid supply 176 to flow into the actuator 168a, increasing the pressure therein to cause the actuator 168a to mechanically actuate the controlled descent switch 166a. In a case where the controlled descent switch 166a is operable to transition the self-retracting lanyard 112a bidirectionally between a fall arrest mode and a controlled descent mode, the manual control 110a may further be operable (e.g. when the lever 111a is pushed to an up position) to induce a pressure drop in the pilot hose 170a (e.g. by pulling a plunger out) to close the valve 178. In such case, the actuator 168a may be spring biased and may include a vent or release valve to release (e.g. to atmosphere) the fluid that has already filled the actuator 168a from the fluid supply 176, so as to cease actuation of the controlled descent switch 166a when the valve 178 is closed.

In a case where the fluid supply 176 includes an internal reservoir of fluid disposed within the main body 114a, the fluid supply 176 may comprise, for example, a replaceable compressed gas cartridge, such as a carbon dioxide ($CO_2$) cartridge that may be inserted into the main body 114a to provide a one-shot use (or in some cases multiple uses) of the controlled descent mode. Upon being depleted or otherwise in need of replacement (e.g. after a single use), the used cartridge may be removed and a new one inserted. Alternatively, the fluid supply 176 may be disposed within the manual control housing 128a instead of in the main body 114a. In this case, upon manipulation of the manual control 110a, the pilot hose 170a may deliver the compressed gas from the fluid supply 176 to actuate the controlled descent switch 166a directly, rather than to actuate a valve in the main body 114a. When using such a manual control housing 128a with integrated fluid supply 176 to actuate the controlled descent switch 166a, it is no longer necessary to provide the fluid supply 176 and valve 178 in the main body 114a. As a result, little if any modification to a preexisting self-retracting lanyard may be necessary.

In the embodiment of FIG. 15, the retractable line 116a need not include the wire 170 and the manual control housing 110a need not include an electric signal generator 174 (though it is contemplated that the valve 178 may be opened by an electric signal instead of a pneumatic/hydraulic signal, in which case the wire 170 and electric signal generator 174 may be used instead of or in addition to the pilot hose 170a). The flexible nature of the pilot hose 170a may allow the manual control housing 110a to be freely assembled within a range of positions along the retractable line 116a (e.g. if the manual control housing 110a has the clam-shell design described above). The pilot hose 170a may coil around the retractable line 116a so as to extend or retract in conjunction with the retractable line 116a.

Figure 16:
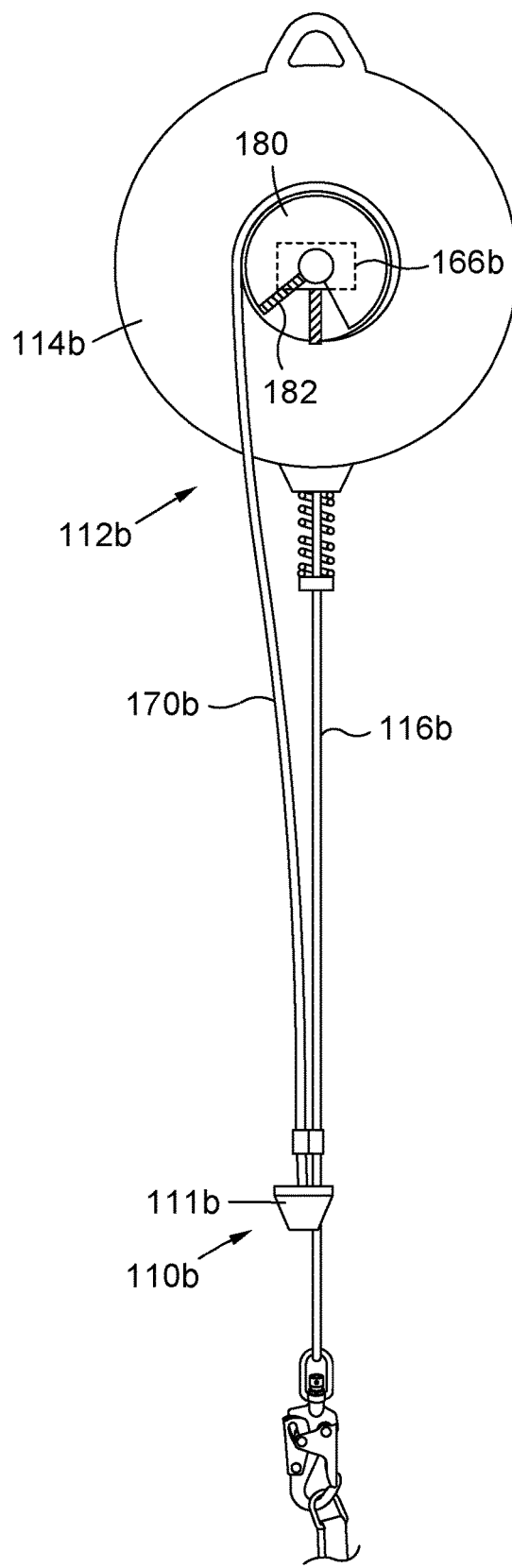
FIG. 16 is a schematic view of another self-retracting lanyard with controlled descent functionality.

FIG. 16 is a schematic view of a self-retracting lanyard 112b according to another embodiment of the innovations described herein. The self-retracting lanyard 112b may be substantially the same as the self-retracting lanyard 112 described above, including a main body 114b having a controlled descent switch 166b and a retractable line 116b that are substantially the same as the main body 114 with controlled descent switch 166 and retractable line 116 of FIGS. 8-14, with the following differences. Whereas the main body 114 includes an actuator 168 that converts a received electric signal into a mechanical motion to actuate the controlled descent switch 166, the main body 114b includes a secondary spool 180 coupled to a cam 182 arranged to actuate the controlled descent switch 166b. Wound on the secondary spool 180 is a controlled descent actuation line 170b terminating in a handle 111b that dangles above the head of the user of the self-retracting lanyard 112b. In some embodiments, the handle 111b may be clipped or otherwise connected to the retractable line 116b to prevent it from swinging around as the user moves or moving out of the user's reach as well as for other purposes described below. The handle 111b is an example of a manual control 110b for initiating controlled descent and may serve as a grip allowing the user to easily pull down on the controlled descent actuation line 170b. Whereas the manual control 110 of FIGS. 8-14 is operable to generate an electric signal on a single path (i.e. the wire 170), the operation of the handle 111b may, in a sense, be regarded as generating a mechanical signal on a signal path (i.e. the controlled descent actuation line 170b). The secondary spool 180 may convert the linear motion imparted on the controlled descent actuation line 170b by the user's hand to rotational motion of the cam 182 that mechanically actuates the controlled descent switch 166b.

Just like the primary spool (not pictured) on which the retractable line 116b is wound, the secondary spool 180 may be a spring biased spool that allows for selective lengthening and shortening of the exposed portion of the controlled descent actuation line 170b while keeping the controlled descent actuation line 170b generally taut. The secondary spool 180 may be operatively coupled to the primary spool so as to move in a linked manner with the primary spool, causing the controlled descent actuation line 170b to extend and retract together with the retractable line 116b as the retractable line 116b extends or retracts to accommodate the user's changing position while the user is working. Alternatively, if the handle 111b is clipped or otherwise connected to the retractable line 116b as described above, the connection between the handle 111b and the retractable line 116b may function to cause the controlled descent actuation line 170b to move together with the retractable line 116b without requiring any coupling between the spools. The controlled descent actuation line 170b may be made of the same material as the retractable line 116b or may be made of a material with reduced strength, as it is not used to support a person's weight.

When the user of the self-retracting lanyard 112b has fallen and the retractable line 116b is restricted from extending relative to the main body 114b, the braking mechanism may further align the secondary spool 180 with the controlled descent switch 166b so as to enable actuation of the controlled descent switch 166b by the cam 182. In this way, extending of the controlled descent actuation line 170b during ordinary extending and retracting of the retractable line 116b doesn't initiate controlled descent mode. Once the secondary spool 180 is aligned with the controlled descent switch 166b, when the user of the self-retracting lanyard 112b reaches up above his head and operates the manual control 110b (e.g. pulls the handle 111b), the mechanical motion of the controlled descent actuation line 170b causes the secondary spool 180 to rotate, bringing the cam 182 into physical contact with the controlled descent switch 166b to mechanically actuate the controlled descent switch 166b. In some embodiments, the controlled descent switch 166b may be spring biased and operable to keep the self-retracting lanyard 112b in a controlled descent mode only so long as the controlled descent switch 166b is depressed or otherwise operated. In such case, the controlled descent mode may require a continuous pulling down on the handle 111b, with the release of the handle 111b causing the controlled descent switch 166b no longer to be operated and to transition the self-retracting lanyard 112b back to a fall arrest mode, thus allowing bidirectional transitioning between the fall arrest mode and the controlled descent mode as described above.

As an alternative to the physical alignment of the secondary spool 180 with the controlled descent switch 166b, other means of preventing inadvertent initiation of controlled descent mode are also contemplated. For example, rather than aligning the secondary spool 180 with the controlled descent switch 166b, the braking mechanism may cause the controlled descent switch 166b (e.g. by means of an electric signal) to enter an active mode in which initiating controlled descent mode is possible. While not in the active mode (e.g. before a fall), the controlled descent switch 166b may be physically contacted by the cam 182 with no effect. Once in the active mode (e.g. after a fall), physical contact by the controlled descent switch 166b may cause the controlled descent switch 166b to initiate controlled descent mode.

In the embodiment of FIG. 16, the retractable line 116b need not include the wire 170 or the manual control housing 128. Alternatively, a manual control housing like the manual control housing 128 or 128a may be freely assembled within a range of positions along the retractable line 116b, for the purpose of providing additional functionality as described above (e.g. inclinometer and alarm functionality). In such case, the handle 111b may be clipped or otherwise connected to the manual control housing 128, 128a instead of to the retractable line 116b.

Figure 17A:
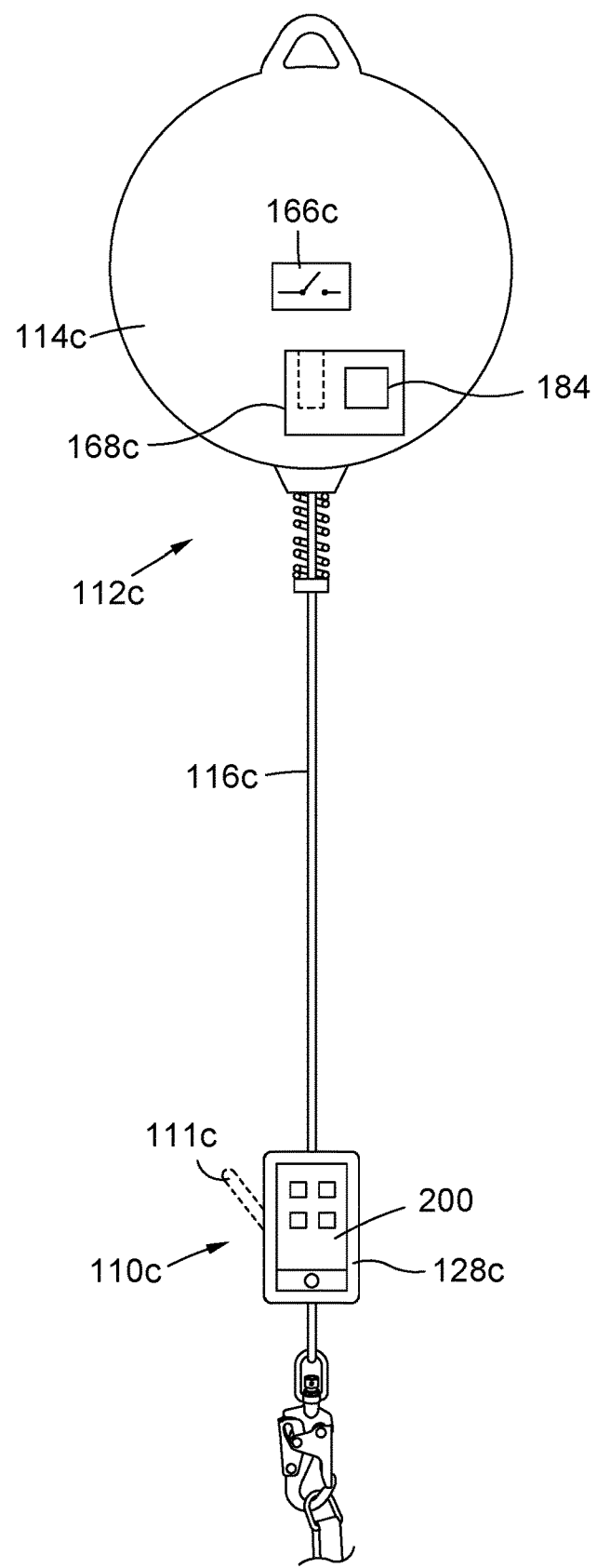
FIG. 17A is a schematic view of another self-retracting lanyard with controlled descent functionality.

FIG. 17A is a schematic view of a self-retracting lanyard 112c according to another embodiment of the innovations described herein. The self-retracting lanyard 112c may be substantially the same as the self-retracting lanyard 112 described above, including a main body 114c with a controlled descent switch 166c and a retractable line 116c that are substantially the same as the main body 114 with controlled descent switch 166 and retractable line 116 of FIGS. 8-14, with the following differences. Whereas the actuator 168 of the self-retracting lanyard 112 converts an electric signal received via the wire 170 into a mechanical motion to actuate the controlled descent switch 166, the actuator 168c includes a wireless receiver 184 and actuates the controlled descent switch 166c in response to receipt of a controlled descent initiation signal by the wireless receiver 184. Upon receiving the controlled descent initiation signal, the wireless receiver 184 may, for example, internally generate an electric signal that causes the actuator 168c to mechanically actuate the controlled descent switch 166c. Instead of the manual control housing 128, the self-retracting lanyard 112c may have a dock 128c to which a mobile device 200 such as a smart phone may be docked. An input device (e.g. touchscreen, button, switch, motion sensor such as a proximity sensor, camera, etc.) of the mobile device 200 may serve as a manual control 110c for initiating controlled descent of the self-retracting lanyard 112c.

Figure 17B:
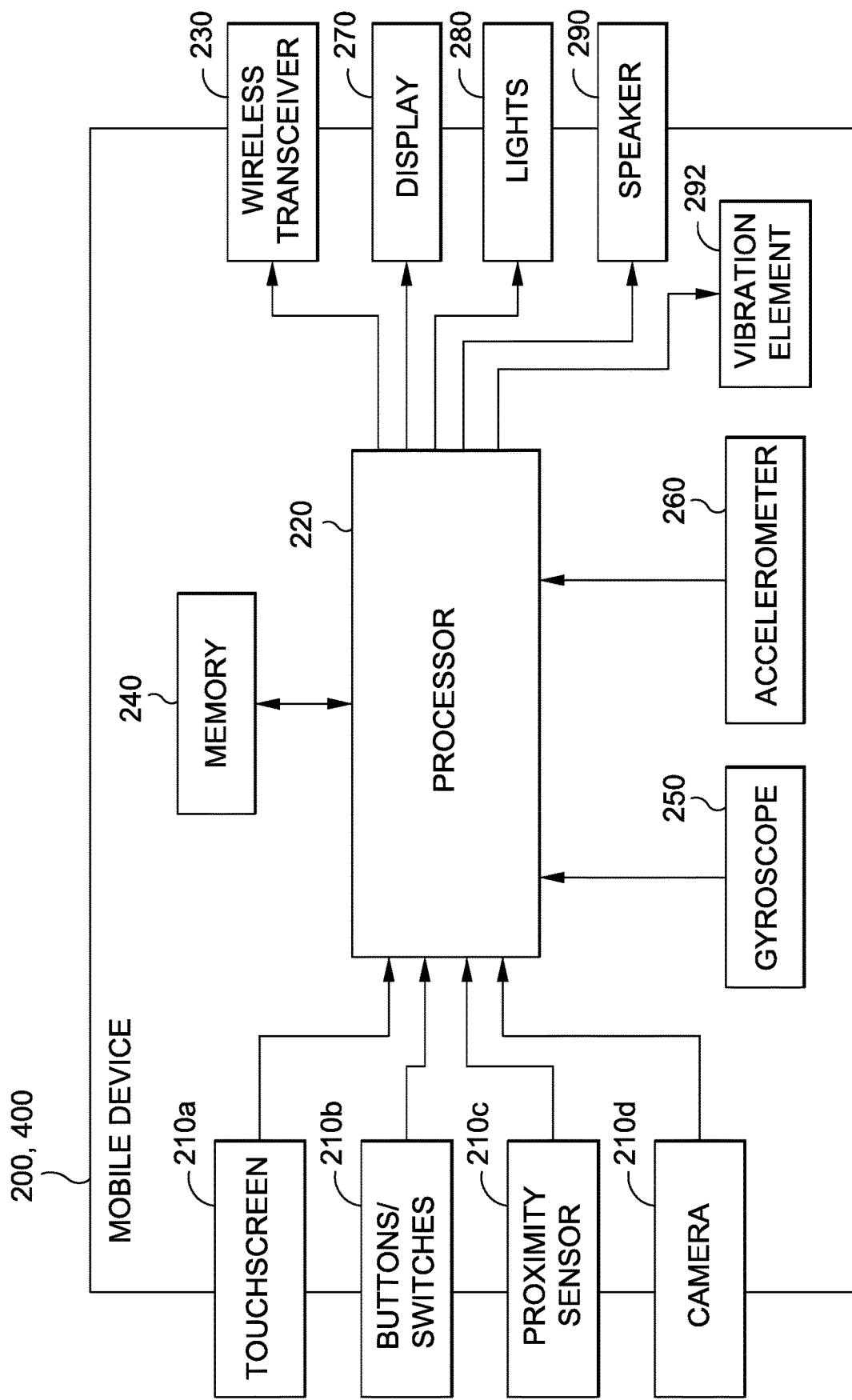
FIG. 17B is a schematic depiction of a mobile device embodying one or more functions of a self-retracting lanyard with controlled descent functionality.

Referring now to the exemplary mobile device 200 schematically illustrated in FIG. 17B, one or more input devices such as a touchscreen 210a, buttons/switches 210b, a proximity sensor 210c, and/or a camera 210d may collectively correspond to the manual control 110c of FIG. 17A. When the user of the self-retracting lanyard 112c reaches up above his head and operates the input device(s) 210a, 210b, 210c, 210d corresponding to the manual control 110c, a processor 220 within the mobile device 200 generates a controlled descent initiation command in response to the user operation of the input device(s) 210a, 210b, 210c, 210d. Upon receipt of the controlled descent initiation command, a transmitter block of a wireless transceiver 230 wirelessly transmits a controlled descent initiation signal. The wireless transceiver 230 may be configured to transmit the controlled descent initiation signal via an antenna in accordance with one or more known wireless communication standards (e.g. Bluetooth™, Wi-Fi, GSM, UMTS). In response to receipt of the controlled descent initiation signal transmitted by the wireless transceiver 230, the wireless receiver 184 of the actuator 168c actuates the controlled descent switch 166c. In a case where the controlled descent switch 166c is operable to transition the self-retracting lanyard 112c bidirectionally between a fall arrest mode and a controlled descent mode, the manual control 110c may further be operable to cease generation of or otherwise cancel the controlled descent initiation command (e.g. in response to a further operation of the input device(s) 210a, 210b, 210c, 210d), causing the wireless transceiver 230 to cease transmission of the controlled descent initiation signal. In such case, the actuator 168c may be spring biased so as to cease actuation of the controlled descent switch 166c when the wireless receiver 184 no longer receives the controlled descent initiation signal.

The mobile device 200 may be, for example, a smart phone belonging to the worker or the worker's employer. Software instructions (e.g. a mobile app) for the above-described functionality may be stored in a memory 240 in communication with the processor 220. In this way, upon execution of the software instructions stored in the memory 240, the processor 220 may cause one or more of the input device(s) 210a, 210b, 210c, 210d of the mobile device 200 to function as the manual control 110c for initiating controlled descent of the self-retracting lanyard 112c.

Alternatively, a peripheral device 111c connectible to the mobile device 200 may function as the manual control 110c, where the peripheral device 111c includes a lever, switch, button, or motion sensor external to the mobile device 200. The peripheral device 111c may a dongle-type peripheral or may be embodied in the dock 128c itself. In the latter case, the mobile device 200 may be plugged into the dock 128c to establish a connection with the peripheral device 111c. The peripheral device 111c is shown in dashed lines as an alternative/optional configuration of the self-retracting lanyard 112c.

In the embodiment of FIGS. 17A and 17B, the self-retracting lanyard 112c need not include the wire 170 or any other signal path between the manual control 110c and the main body 114c (as the controlled descent initiation signal is transmitted wirelessly). The dock 128c may be freely assembled within a range of positions along the retractable line 116c.

In accordance with the embodiment of FIGS. 17A and 17B, additional functionality as described above in relation to FIGS. 1-7 (e.g. inclinometer and alarm functionality) may be realized in the mobile device 200. To this end, the software instructions executed by the processor 220 may further cause one or more of the components of the mobile device 200 to function as the inclinometer 152, speaker 158, first alarm light 162, second alarm light 164, and vibrating element 166. For example, a gyroscope 250 and/or accelerometer 260 of the mobile device 200 may function as the inclinometer 152, a display 270 and/or lights 280 of the mobile device 200 may function as the first alarm light 162 and second alarm light 164, a speaker 290 of the mobile device 200 may function as the speaker 158, and a vibration element 292 (e.g. an off-center motor) of the mobile device 200 may function as the vibrating alarm element 166. As a user of the self-retracting lanyard 112c moves along the platform 120, the gyroscope 250 and/or accelerometer 260 may detect the magnitude of an angle between the retractable line 116c of the self-retracting lanyard 112c and the vertical axis, and the processor 220 may generate a signal when the detected magnitude exceeds a preset threshold. That signal may then be communicated to an alarm element, such as the speaker 290, display 270, lights 280, and/or vibration element 292. The alarm element then emits a signal to provide an alert to the user that the user is in an unsafe location, and to return to a safer zone or region. By taking advantage of mobile device components appropriately programmed using a mobile app in this way, it is possible to omit dedicated components of the self-retracting lanyard 112c.

Along the same lines, it should be noted that the functionality of the power supply element 156, communication port 154, velocimeter 155, and location monitor 157, as well as any other described functionality of the processor 150 and memory 160, may also be embodied in appropriate components of the mobile device 200. To this end, in addition to those pictured elements, the mobile device 200 may further include a mobile device battery, data port, GPS, and/or compass.

It is also contemplated that the software instructions executed by the processor 220 may include the above inclinometer and alarm functionality and not the above controlled descent functionality. In this regard, the mobile device 200 may function as the alarm device 10 described in relation to FIGS. 1-7. A conventional self-retracting lanyard may be retrofitted with a dock similar to the dock 128c, with the alarm functionality (including inclinometer functionality) completely embodied in a mobile device 200 as described above. If the above-described controlled descent functionality is omitted, a conventional main body 14 may be used (e.g. without wireless receiver 184).

In a case where the mobile device 200 is used only for controlled descent functionality and not for inclinometer and alarm functionality, it is also contemplated that the dock 128c may be completely omitted and the mobile device 200 kept in the worker's pocket or elsewhere, including in the possession of another person (e.g. team leader, safety personnel, etc.). When the worker wearing the self-retracting lanyard 112c experiences a fall and requires rescue, the worker or other person may operate the input device(s) 210a, 210b, 210c, 210d of the mobile device 200 functioning as the manual control 110c to initiate controlled descent of the self-retracting lanyard 112c by wireless transmission. If the mobile device 200 is in the worker's pocket or otherwise on the worker's person, the fall itself may be detected using the mobile device 200. For example, a sudden "jerk" caused by the braking mechanism of the retractable line 116 may cause a measurement of the accelerometer 260 to exceed a threshold indicating fall detection in accordance with appropriate instructions performed by the processor 220. In response to such fall detection, the processor 220 may initiate a fall alarm using the display 270, lights 280, and/or speaker 290, and/or may automatically notify another party (other employees, employer, emergency services, etc.) by transmitting a wireless signal using the wireless transceiver 230. A person receiving the notification (e.g. on another mobile device 200) may then initiate a rescue response. If the notification is received at a mobile device 200 that is capable of functioning as the manual control 110c as described above, it is contemplated that the person receiving the notification may initiate controlled descent of the self-retracting lanyard 112c by wireless transmission using the mobile device 200, which may be especially advantageous in a case where the worker is unconscious. In this regard, it is envisioned that designated safety personnel, supervisors, or other people may operate a mobile app on a supervisor mobile device 200 that is linked to one or more self-retracting lanyards 112c and/or worker mobile devices 200. Such mobile app may be capable of receiving alerts from the linked self-retracting lanyards 112c and/or worker mobile devices 200 and, in some embodiments, initiating controlled descent of the one or more linked self-retracting lanyards 112c.

Such a mobile application ("app") on a supervisor or worker's mobile device 200 may include various other features aimed at communicating information and performing functions for keeping worker's safe while working at height. For example, an app installed on a supervisor's mobile device 200 may communicate with a worker's mobile device 200 to provide telemetry and status including, for example, worker height/altimeter, GPS and/or work cell coordinates, temperature, time of day, elapsed time (e.g. job start stop), worker name and credentials, device status, battery life, productivity based on use, cycles, cable angle, etc., work area/work cell name, equipment description, preventative maintenance based on cycles, job summary, connection status, system overview, user profile, G-meter, cycles based on altitude change, frequency of use, etc. including subscription-based service thereof. In addition to telemetry and status, the app may also provide functions such as GPS tracking, walkie-talkie communication between worker and supervisor, camera, messaging, supervisor/administrator-operated remote-controlled descent, remote hook lowering of self-retracting lanyards in an unloaded state, remote horizontal traversing of self-retracting lanyards, etc.

Figure 18:
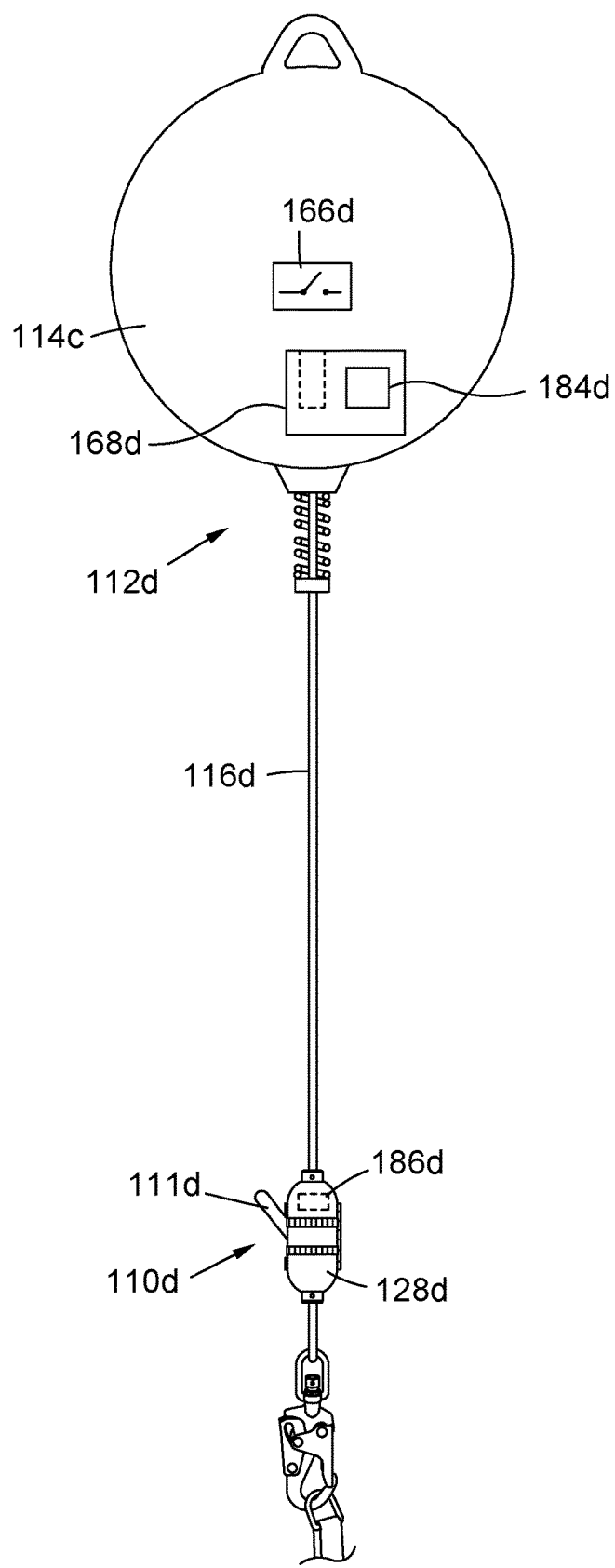
FIG. 18 is a schematic view of another self-retracting lanyard with controlled descent functionality.

FIG. 18 is a schematic view of a self-retracting lanyard 112d according to another embodiment of the innovations described herein. The self-retracting lanyard 112d may be substantially the same as the self-retracting lanyard 112c described above with respect to FIG. 17A, including a main body 114d with a controlled descent switch 166d and actuator 168d (including wireless receiver 184d) and a retractable line 116d that are substantially the same as the main body 114c with controlled descent switch 122c and actuator 168c (including wireless receiver 184) and fallarresting cable 116c of FIG. 17A, with the following differences. Whereas the self-retracting lanyard 112c includes a dock 128c for holding a mobile device in place of the manual control housing 128 of FIGS. 8-14, the self-retracting lanyard 112d omits the dock 128c and includes a manual control housing 128d similar to the manual control housing 128 of FIGS. 8-14. The manual control housing 128d may include a manual control 110d similar to the manual control 110 (e.g. including a lever 111d as illustrated) as well as a wireless transmitter 186d. The manual control 110d is operable to generate a controlled descent initiation command within the manual control housing 128d. Upon receipt of the controlled descent initiation command, the wireless transmitter 186d transmits the controlled descent initiation signal. In this way, the self-retracting lanyard 112d may include a dedicated wireless transmitter 186d instead of using a wireless transceiver 230 of a mobile device 200 like the self-retracting lanyard 112c.

The self-retracting lanyard 112d of FIG. 18 may be substantially the same as the self-retracting lanyard 112 of FIGS. 8-14 but with wireless transmission replacing the wired transmission of a signal from the manual control housing 128 to the actuator 168. As such, the contents of the manual control housing 128d may be substantially the same as those of the manual control housing 128 (see FIGS. 12-14) but with the wireless transmitter 186d in place of or in addition to the signal generator 174. The wire 170 (and connector 172) may be omitted, and the manual control housing 128d may be freely assembled within a range of positions along the retractable line 116d. The wireless transmitter 186d (which may also refer to a wireless transceiver or a transmitter block of a wireless transceiver) may be configured to transmit the controlled descent initiation signal via an antenna in accordance with one or more known wireless communication standards (e.g. Bluetooth™, Wi-Fi, GSM, UMTS). In response to receipt of the controlled descent initiation signal transmitted by the wireless transmitter 186d, the wireless receiver 184d of the actuator 168d actuates the controlled descent switch 166d. In a case where the controlled descent switch 166d is operable to transition the self-retracting lanyard 112d bidirectionally between a fall arrest mode and a controlled descent mode, the manual control 110d may further be operable to cease generation of or otherwise cancel the controlled descent initiation command (e.g. when the lever 111d is pushed to an up position), causing the wireless transmitter 186d to cease transmission of the controlled descent initiation signal. In such case, the actuator 168d may be spring biased so as to cease actuation of the controlled descent switch 166d when the wireless receiver 184d no longer receives the controlled descent initiation signal.

Various combinations and modifications of the above embodiments are also contemplated. For example, inclinometer functionality may reside in a housing or dock on the retractable line, while alarm functionality may reside in the main body. In response to an unsafe angle of incline, a dedicated or mobile device transmitter may transmit a signal to a wireless receiver in the main body, which produces an audio or visual alarm. This may be advantageous if the main body can support louder speakers, brighter lights, etc. than the housing or mobile device. If controlled descent functionality is also included, the wireless transmitter and wireless receiver can thus be used for both alarm and controlled descent functionality for increased efficiency and reduced cost.

Various aspects of the present disclosure pertain to a self-retracting lanyard system with emergency response communication functionality. As described above, it is understood that self-retracting lanyards may be connected to a harness worn by an individual working or otherwise located in a potentially dangerous environment, such as an elevated location associated with a falling hazard. The self-retracting lanyard system may include the harness and an electronic device that is disposable on the harness. When the user of the self-retracting lanyard experiences a fall and is dangerously suspended and/or injured, the electronic device may compare an accelerometer measurement to a threshold to detect that the user of the self-retracting lanyard has fallen and instruct a wireless transmitter to transmit a wireless signal to emergency responses services or personnel. The self-retracting lanyard system may or may not further include the alarm functionality described above in relation to FIGS. 1-7 and/or the controlled descent functionality described above in relation to FIGS. 8-18.

Referring again to the drawings, FIGS. 19-21B depict exemplary embodiments of a self-retracting lanyard system with emergency response communication functionality. The self-retracting lanyard system may include, in addition to the harness 13, an electronic device 400 disposable on the harness 13 (see FIGS. 20, 21A, and 21B). The electronic device 400 may be an existing mobile telecommunications device such as a smart phone. Alternatively, the electronic device 400 may be a custom device having the features described herein and may, for example, consist of a compact plastic enclosure that houses electronics. In this regard, the electronic device 400 may have any or all of the features of the mobile device 200 (see FIG. 17B).

Of particular note for purposes of the present disclosure, the electronic device 400 may have a processor 220, a wireless transceiver 230, a memory 240, and an accelerometer 260 (see FIG. 17B). In accordance with instructions stored on the memory 240, the processor 220 may receive a measurement from the accelerometer 260, compare the measurement to a threshold, and detect that the user of the self-retracting lanyard 12 has fallen based on a result of the comparison. For example, as explained above, a sudden "jerk" caused by the braking mechanism of the retractable line 116 may cause a measurement of the accelerometer 260 to exceed a threshold indicating fall detection in accordance with appropriate instructions performed by the processor 220. If the electronic device 400 includes a gyroscope 250, the detection of the fall may further depend on a measurement from the gyroscope 250, e.g. a comparison of the measurement of the gyroscope 250 to a threshold. In response to such fall detection, the processor 220 instructs a wireless transmitter such as the wireless transceiver 230 to transmit a wireless signal, for example, over a cellular or Wi-Fi network or as a beacon (e.g. Bluetooth beacon). In this way, the electronic device 400 may automatically notify another party (other employees, employer, emergency services including subscription-based emergency services tailored for the subscribing organization, etc.) as described above. The notified party may then initiate a rescue response.

The wireless transmitter that transmits the wireless signal to emergency response personnel may or may not be included in the electronic device 400. In particular, it is contemplated that the wireless transceiver 230 of the electronic device 400 may only be used to establish a short-wireless connection (e.g. via Bluetooth pairing) to an external device such as a smart phone in the user's pocket or electronics in a housing 128 disposed on the retractable line 116 (see FIGS. 12-14). In this case, the wireless transmitter that transmits the wireless signal to emergency response personnel, e.g. over a cellular network, may be included in the external device. The electronic device 400 may instruct such external wireless transmitter to transmit the wireless signal via the short-range wireless connection. Other short-range data links between the electronic device 400 and the external device, including wired connections (e.g. USB), are also contemplated, in which case the electronic device 400 may not include the wireless transceiver 230 at all.

As noted above, the electronic device 400 may be paired with an external device (e.g. a smart phone having some or all of the components of the mobile device 200 shown in FIG. 17B) over a short-range data link such as a short-range wireless connection. In such case, the operation of the electronic device 400, including the configuration of the electronic device 400 to instruct the external device to transmit the wireless signal, may be controlled by a software application installed on the external device such as a smart phone app. The app may have a user-friendly graphical user interface for configuring the paired electronic device 400. The app may communicate with other applications to leverage other data and settings stored on the smart phone. For example, in accordance with a user's configuration selections, the electronic device 400 may, in the event of a detected fall, instruct the wireless transmitter of the smart phone to transmit the wireless signal to one or more contacts on a list of contacts stored in the smart phone, such as an address book or designated list of emergency contacts.

It is also contemplated that either the electronic device 400 itself or a paired external device with the installed app may have some or all of the additional structure and functionality described herein. This may include, for example, the described display 270, lights 280, and/or speaker 290 and functionality to initiate a fall alarm using one or more such output devices (see FIG. 17B), the manual control 110*c* for initiating controlled descent, e.g. a touchscreen, button, switch, motion sensor such as a proximity sensor, camera, etc. of the electronic device 400 or paired external device (see FIGS. 17A and 17B), etc. The suspended user may, for example, be able to initiate controlled descent at the touch of a button on the electronic device 400 or paired external device without needing to reach above his/her head to a housing 128 disposed on the retractable line 116.

The electronic device 400 or paired external device may further have real-time location tracking functionality in order to allow emergency response personnel to quickly locate the suspended user. To this end, the electronic device 400 or paired external device may include a global positioning system (GPS) as noted above. In response to a detected fall, the processor 220 of the electronic device 400 may instruct the wireless transmitter to transmit location data associated with the detection, such as GPS data of the electronic device 400 at the time that the fall was detected or GPS data of the paired external device at the time that the fall was detected.

Additional functionality of the electronic device 400 and/or paired external device may include the ability on the part of the user to stop a prematurely or accidentally generated signal to emergency response personnel. For example, the user may have only fallen a short distance and may be able to rescue himself without assistance. In this regard, the processor 220 may, in response to the detection that the user has fallen, initiate a countdown during which the user may prevent the electronic device 400 from instructing the wireless transmitter to transmit the wireless signal. During the countdown, the user may interrupt the transmission of the wireless signal, for example, by interacting with a touchscreen, button, switch, motion sensor such as a proximity sensor, camera, etc. of the electronic device 400 and/or paired external device.

Figure 20:
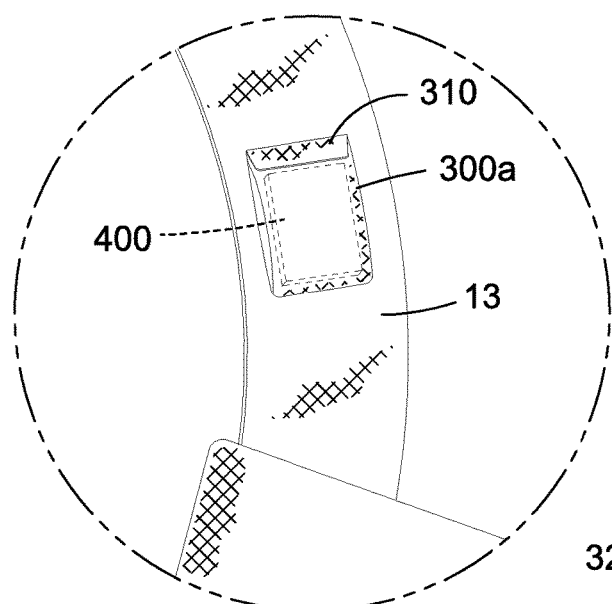
FIG. 20 is a closeup view of the harness of the self-retracting lanyard system, showing a pocket formed integrally with the harness.
Figure 21A:
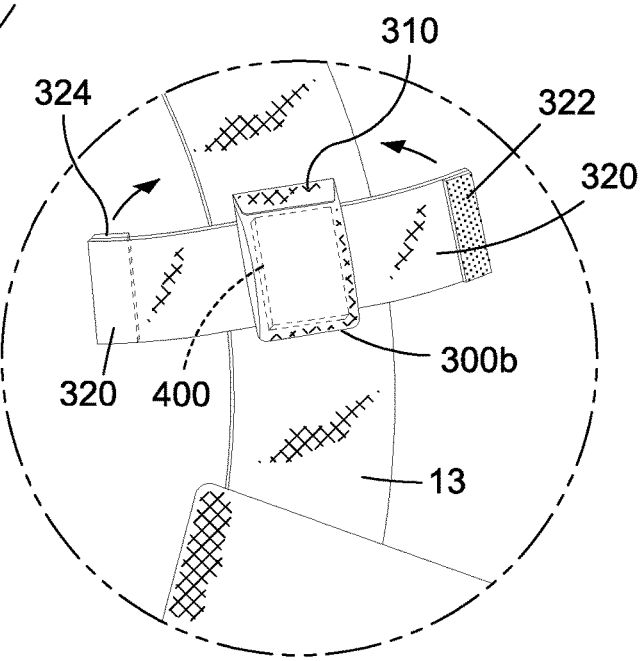
FIG. 21A is a closeup view of the harness of the self-retracting lanyard system according to an alternative embodiment, showing a pocket that includes a fastener for removably fixing the pocket to the harness, the pocket being in an unfixed state.
Figure 21B:
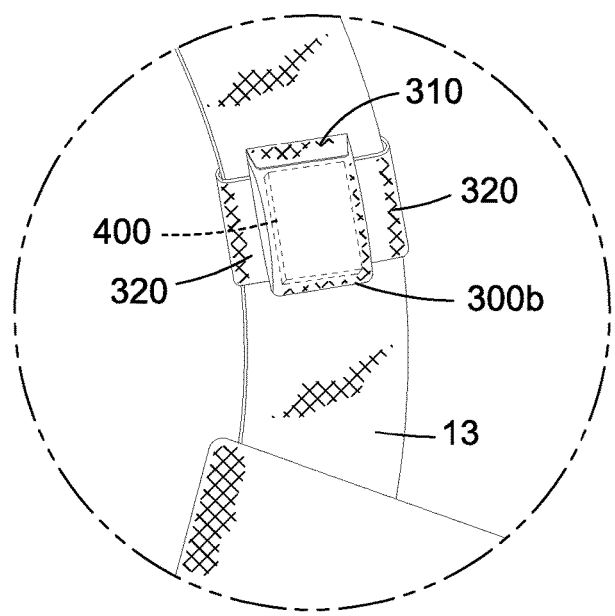
FIG. 21B is a closeup view of the harness of the self-retracting lanyard system with the pocket that includes the fastener for removably fixing the pocket to the harness, the pocket being in a fixed state.

The electronic device 400 may be disposable on the harness 13 as shown, for example, in FIGS. 20, 21A, and 21B. FIG. 20 is a closeup view of the harness 13 of the self-retracting lanyard system, showing a pocket 300*a* formed integrally with the harness 13. The pocket 300*a* may, for example, be built into the fabric of the harness 13 and may be sized to accommodate the electronic device 400. For example, the electronic device 400 may be around 25×40×8 mm and the pocket 300 may be slightly larger (e.g. around 28×43×11 mm) so that the electronic device 400 fits easily but snugly in the pocket 300*a*. The pocket 300*a* may include a flap 310 that may be closed to protect the electronic device 400 (e.g. from dust) and opened to remove the electronic device 400 from the pocket 300*a*. As noted above, the harness 13 may have a low price point and may be considered a "consumable," to be replaced as the fabric becomes worn due to frequent contact with the user's body. By providing the pocket 300*a* for insertion and removal of the electronic device 400, it is possible to use the same electronic device 400 with multiple harnesses 300*a*, allowing the electronic device 400 to be reused from user to user or as harnesses 300*a* become worn. In this way, the emergency response communication functionality described herein may be efficiently implemented without unduly multiplying the cost of the electronic devices 400.

FIGS. 21A and 21B are alternative closeup views of the harness 13 of the self-retracting lanyard system, showing a pocket 300*b* instead of the pocket 300*a*. Whereas the pocket 300*a* is formed integrally with the harness 13, the pocket 300*b* is a separate piece that may be removably fixed to the harness 13. To this end, the pocket 300*b* may have one or more fasteners 322, 324 such as hook-and-loop fasteners (e.g. Velcro) formed on one or more arms 320 of the pocket 300*b* as shown in FIG. 21A. The pocket 300*b* may be fixed to the harness 13 by wrapping the one or more arms 320 around a strap of the harness 13 as shown in FIG. 21B, with one of the fasteners 322 (e.g. hooks) mating with another of the fasteners 324 (loops) to hold the pocket 300*b* in place. Any of various fastening mechanisms may be used as the one or more fasteners 322, 324, for example, hook-and-loop fasteners, a threaded stud, a tie, adhesive, etc., as well as any of various fastening arrangements, for example, two arms 320 that wrap around the harness 13, a single arm 320 that wraps around the harness, armless arrangements that puncture through, clamp to, or adhere to the harness 13, etc. Because the pocket 300*b* may be removably fixed to the harness 13, it may be used to retrofit a conventional harness 13.

Figure 19:
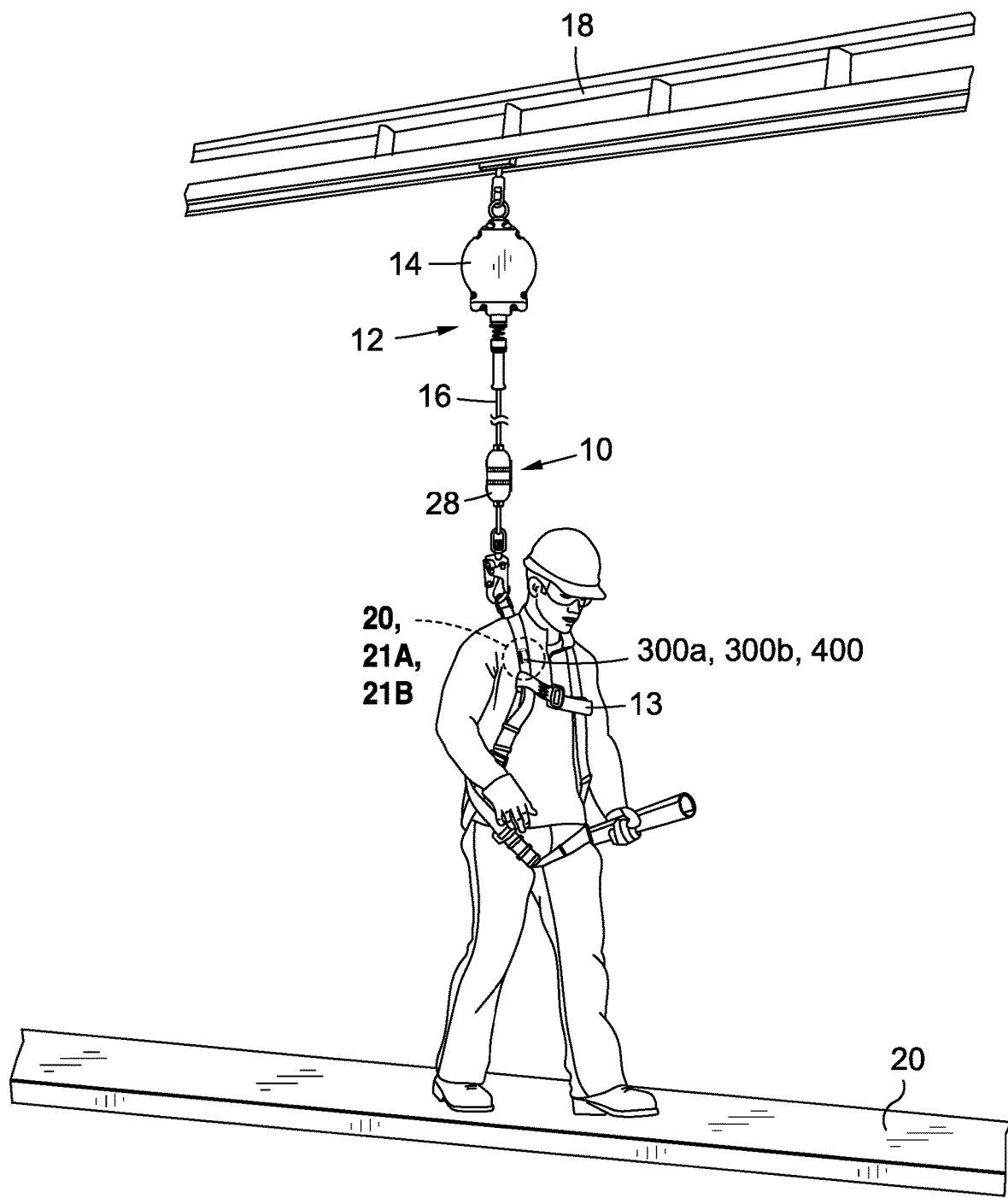
FIG. 19 is a front view of a self-retracting lanyard system with emergency response communication functionality.

For ease of explanation, the self-retracting lanyard system including the electronic device 400 is described as a modification of the embodiment shown in FIGS. 1-7 and is thus depicted in FIG. 19 as including the alarm device 10. However, the disclosure is not intended to be so limited. The self-retracting lanyard system including the electronic device 400 may instead be a modification of any of the embodiments shown in FIGS. 8-18, including controlled descent functionality, or may be a modification of a conventional self-retracting lanyard system having neither alarm functionality nor controlled descent functionality.

The memories 60, 160, 240 described herein may function as non-transitory program storage media on which are stored instructions executable by a processor or programmable circuit to perform the various operations described above. In this regard, the processors 50, 150, 220 described herein are examples of a processor or programmable circuit that executes such stored instructions. The various wireless transmitters and receivers described herein are not intended to be limited to devices with exclusive transmission or reception functionality and may also refer to transceivers.

Additional functionality of the various self-retracting lanyards described above may include, e.g. a regenerative electrical system employed to recharge a battery when the retractable line moves up or down, photovoltaic cells to maintain the battery and increase its life, and a low battery indicator and "test" function with visual and/or audible alerts. Further additional functionality may include, for example, a "tag out" lock preventing the system from being used after a fall pending inspection and recertification, self-diagnosis and "service due" indicators, and automatic transmission of a fall event to a recording device and/or to emergency personnel. An accelerometer (dedicated or a component of a mobile device) may be used to determine if a fall has occurred.

FIGS. 22A and 22B are schematic views of a self-retracting lanyard 112e according to another embodiment of the innovations described herein. The self-retracting lanyard 112e may be substantially the same as any of the self-retracting lanyards 112, 112a, 112b, 112c, 112d described above and is illustrated as a modified version of the self-retracting lanyard 112 (FIG. 11A) by way of example only. The self-retracting lanyard 112e differs from the self-retracting lanyards 112, 112a, 112b, 112c, 112 in the inclusion of a solar charging system comprising one or more solar panels 188 (e.g. photovoltaic cells) and a charger 190 for charging the battery or other power supply element 156 within the manual control housing 128 using energy generated by the solar panel(s) 188. The solar panel(s) 188 may be disposed on the main body 114 of the self-retracting lanyard 112e, preferably in an upper region thereof so as to receive direct sunlight and/or other man-made light sources for use indoors. The charger 190, which may be an induction charger or a conventional charger with electrical contacts, may be positioned at the bottom of the main body 114 where the retractable line 116 enters the main body 114 as it retracts. In the example of FIGS. 22A and 22B, the charger 190 is positioned at the bottom of a shock-absorbing coil that absorbs the impact of the manual control housing 128 or other hardware as the retractable line 116 retracts. In addition to the solar panels 188 themselves, the main body 114 may house circuitry associated with the solar panels 188, such as a charger battery or capacitor for storing the generated energy if not provided within the charger 190 itself. A wire 192 may be provided to electrically connect the charger 190 to the main body 114 if necessary, depending on the structure of the charger 190. The charger 190 may, for example, extend directly from the main body 114 without a connecting wire 192.

When the self-retracting lanyard 112e is in use, the retractable line 116 is generally pulled out of the main body 114 as shown in FIG. 22A, such that the manual control housing 128 is not docked with the charger 190. When the self-retracting lanyard 112e is no longer in use, the retractable line 116 may be retracted completely to a "home position," causing the manual control housing 128 to dock with the charger 190. When docked, the manual control housing 128 may be in close enough proximity to allow induction charging of the battery 156 (see FIGS. 12 and 14) by the charger 190. In the case of conventional charging, docking may establish electrical contact between electrical contacts on the charger 190 and the outside of the manual control housing 128 for charging the battery 156. In this way, as long as the retractable line 116 is retracted while the self-retracting lanyard 112e is not in use, the battery 156 of the manual control housing 128 may be charged by the solar panel(s) 188 and charger 190 during this time (e.g. by trickle charging), helping to ensure that the manual control 110 and other functionality is always at full battery when a worker begins a shift using the self-retracting lanyard 112e. Alternatively or additionally to rechargeable cartridge style batteries (e.g. lithium ion), the manual control housing 128 may in some cases use commonly available rechargeable or non-rechargeable batteries such as nickel cadmium batteries.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A self-retracting lanyard comprising:
   a main body;
   a retractable line coupled to the main body so as to be extendible and retractable relative to the main body and to be restricted from extending relative to the main body in response to a user of the self-retracting lanyard falling;
   a housing adapted to be engageable with the retractable line;
   a manual control disposed on the housing and operable by the user to initiate controlled descent of the retractable line relative to the main body;
   a fluid supply disposed in the housing; and
   a hose extending from the housing to the main body, wherein the main body includes an actuator arranged to actuate a controlled descent switch that initiates the controlled descent;
   the manual control is operable by the user to deliver a fluid from the fluid supply to the actuator via the hose; and
   the actuator is configured to actuate the controlled descent switch in response to receiving the fluid.

2. The self-retracting lanyard of claim 1, wherein the fluid supply comprises a compressed gas canister.

3. The self-retracting lanyard of claim 2, wherein the compressed gas canister is a carbon dioxide canister.

4. The self-retracting lanyard of claim 1, wherein the hose coils around the retractable line so as to extend or retract in conjunction with the retractable line.

5. The self-retracting lanyard of claim 1, wherein the manual control includes a lever, switch, button, or motion sensor on the housing.

6. The self-retracting lanyard of claim 1, further comprising:
   a battery disposed in the housing;
   a solar panel disposed on the main body; and
   a charger disposed on the main body at a position where the retractable line enters the main body as it retracts, wherein
   the housing is configured to dock with the charger when the retractable line retracts such that the battery is charged by the charger using energy generated by the solar panel.

7. The self-retracting lanyard of claim 6, wherein the charger is configured to charge the battery by induction charging.

8. The self-retracting lanyard of claim 6, wherein the charger is configured to establish electrical contact with the housing.

9. The self-retracting lanyard of claim 6, wherein the charger is configured to charge the battery by trickle charging.

10. The self-retracting lanyard of claim 6, wherein the battery is a lithium ion battery.

11. The self-retracting lanyard of claim 6, wherein the battery is a nickel cadmium battery.

12. The self-retracting lanyard of claim 6, wherein
the main body includes an actuator arranged to actuate a controlled descent switch that initiates the controlled descent,
the manual control is operable by the user to generate an electric signal on a signal path extending from the housing to the main body, the generation of the electric signal being powered by the battery, and
the actuator is configured to actuate the controlled descent switch in response to the electric signal.

13. The self-retracting lanyard of claim 12, wherein the signal path includes a wire in the retractable line.

14. The self-retracting lanyard of claim 12, wherein the manual control includes a lever, switch, button, or motion sensor on the housing.

15. The self-retracting lanyard of claim 6, wherein
the main body includes an actuator arranged to actuate a controlled descent switch that initiates the controlled descent, the actuator including a wireless receiver,
the manual control is operable by the user to transmit a wireless controlled descent initiation command, the transmission of the wireless controlled descent initiation command being powered by the battery, and
the actuator is configured to actuate the controlled descent switch in response to receipt of the wireless controlled descent initiation signal by the wireless receiver.

16. The self-retracting lanyard of claim 15, wherein the manual control includes a lever, switch, button, or motion sensor on the housing.

17. A method comprising:
providing a self-retracting lanyard including a main body and a retractable line coupled to the main body so as to be extendible and retractable relative to the main body and to be restricted from extending relative to the main body in response to a user of the self-retracting lanyard falling;
attaching the retractable line to a user of the self-retracting lanyard;
engaging a housing with the retractable line;
initiating a controlled descent of the retractable line relative to the main body in response to operation by the user of a manual control disposed on the housing;
providing a fluid supply disposed in the housing;
attaching a hose extending from the housing to the main body, wherein the main body includes an actuator arranged to actuate a controlled descent switch that initiates the controlled descent;
the manual control is operable by the user to deliver a fluid from the fluid supply to the actuator via the hose; and
the actuator is configured to actuate the controlled descent switch in response to receiving the fluid.

18. The method of claim 15, further comprising:
providing a solar panel and a charger on the main body; and docking the housing with the charger such that the battery is charged by the charger using energy generated by the solar panel.

19. A self-retracting lanyard comprising:
a main body;
a retractable line coupled to the main body so as to be extendible and retractable relative to the main body and to be restricted from extending relative to the main body in response to a user of the self-retracting lanyard falling;
a manual control operable by the user to initiate controlled descent of the retractable line relative to the main body;
a solar powered charger disposed on the main body and configured to charge the manual control when the retractable line is retracted;
a fluid supply disposed in the housing; and
a hose extending from the housing to the main body, wherein the main body includes an actuator arranged to actuate a controlled descent switch that initiates the controlled descent;
the manual control is operable by the user to deliver a fluid from the fluid supply to the actuator via the hose; and
the actuator is configured to actuate the controlled descent switch in response to receiving the fluid.

* * * * *